United States Patent
Krishna et al.

(10) Patent No.: US 10,756,985 B2
(45) Date of Patent: *Aug. 25, 2020

(54) ARCHITECTURE FOR IMPLEMENTING USER INTERFACES FOR CENTRALIZED MANAGEMENT OF A COMPUTING ENVIRONMENT

(71) Applicant: Nutanix, Inc., San Jose, CA (US)

(72) Inventors: Kothuri Venkata Vamsi Krishna, San Jose, CA (US); Akshay Deodhar, Cupertino, CA (US); Zhi Yao Xie, San Jose, CA (US); Jon Carlo Gueco, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 271 days.

This patent is subject to a terminal disclaimer.

(21) Appl. No.: 15/006,435

(22) Filed: Jan. 26, 2016

(65) Prior Publication Data

US 2020/0036597 A1    Jan. 30, 2020

Related U.S. Application Data

(60) Provisional application No. 62/108,520, filed on Jan. 27, 2015, provisional application No. 62/108,515, filed on Jan. 27, 2015.

(51) Int. Cl.
| | |
|---|---|
| *G06F 3/048* | (2013.01) |
| *H04L 12/24* | (2006.01) |
| *H04L 29/08* | (2006.01) |
| *G06F 3/0484* | (2013.01) |

(52) U.S. Cl.
CPC ........... *H04L 41/22* (2013.01); *G06F 3/0484* (2013.01); *H04L 67/1097* (2013.01); *H04L 67/2842* (2013.01)

(58) Field of Classification Search
CPC . H04L 41/22; H04L 67/1097; H04L 67/2842; G06F 3/0484
See application file for complete search history.

(56) References Cited

U.S. PATENT DOCUMENTS

| | | | | |
|---|---|---|---|---|
| 6,031,533 A | * | 2/2000 | Peddada | G06F 8/61 715/733 |
| 6,690,400 B1 | * | 2/2004 | Moayyad | G06F 3/0605 715/775 |
| 7,444,633 B2 | * | 10/2008 | Bohn | H04L 67/34 718/1 |
| 7,809,833 B2 | | 10/2010 | Shen et al. | |
| 8,549,518 B1 | | 10/2013 | Aron et al. | |

(Continued)

OTHER PUBLICATIONS

"IBM Tivoli Storage Manager for Linux", published on Apr. 2003, [online] http://publib.boulder.ibm.com/tividd/td/ITSML/GC23-4691-01/en_US/HTML/anrlrf51225.htm (Year: 2003).*

(Continued)

*Primary Examiner* — Mahelet Shiberou
(74) *Attorney, Agent, or Firm* — Vista IP Law Group, LLP

(57) ABSTRACT

The present disclosure provides an improved approach to implement a management infrastructure for computing environments. The user interfaces for local management nodes are cached at a central management node. The cached copies of the local node UIs can then be executed as if the user was actually operating from the local node.

21 Claims, 23 Drawing Sheets

(56) References Cited

U.S. PATENT DOCUMENTS

| | | |
|---|---|---|
| 8,601,473 B1 | 12/2013 | Aron et al. |
| 8,621,569 B1 | 12/2013 | Ewing |
| 8,634,330 B2 | 1/2014 | Ganapathy et al. |
| 8,671,176 B1 | 3/2014 | Kharitonov et al. |
| 8,850,130 B1 | 9/2014 | Aron et al. |
| 9,003,141 B2 | 4/2015 | Nielsen et al. |
| 9,189,284 B2 | 11/2015 | Collins et al. |
| 9,231,988 B2 | 1/2016 | Holt et al. |
| 9,239,820 B1* | 1/2016 | Marks .................. G06F 17/212 |
| 9,268,590 B2 | 2/2016 | Du et al. |
| 9,772,866 B1 | 9/2017 | Aron et al. |
| 2002/0054152 A1* | 5/2002 | Palaniappan ........... G06F 9/454 715/810 |
| 2002/0129136 A1* | 9/2002 | Matharu ............... H04L 41/046 709/223 |
| 2003/0058277 A1* | 3/2003 | Bowman-Amuah ....................... G06F 17/30607 715/765 |
| 2003/0110262 A1* | 6/2003 | Hasan ................. H04L 41/0213 709/226 |
| 2005/0149501 A1 | 7/2005 | Barrett |
| 2006/0259592 A1 | 11/2006 | Angeline |
| 2007/0043550 A1 | 2/2007 | Tzruya |
| 2007/0106748 A1 | 5/2007 | Jakobsson et al. |
| 2008/0015823 A1* | 1/2008 | Arnold ...................... G06F 8/20 703/1 |
| 2008/0040661 A1* | 2/2008 | Curtis ................. G06F 17/3089 715/243 |
| 2008/0091800 A1 | 4/2008 | Sorrentino et al. |
| 2008/0177839 A1 | 7/2008 | Chang et al. |
| 2009/0019436 A1 | 1/2009 | Hartz et al. |
| 2009/0077623 A1 | 3/2009 | Baum et al. |
| 2009/0150851 A1* | 6/2009 | Boer ................... G06F 9/44536 717/100 |
| 2009/0241104 A1 | 9/2009 | Amiga et al. |
| 2009/0282333 A1* | 11/2009 | Olsen ................. G06F 17/2247 715/703 |
| 2010/0077362 A1 | 3/2010 | Allred et al. |
| 2010/0269152 A1 | 10/2010 | Pahlavan et al. |
| 2011/0209047 A1* | 8/2011 | Olsen ................. G06F 17/2247 715/234 |
| 2011/0252117 A1 | 10/2011 | Sng et al. |
| 2011/0277027 A1* | 11/2011 | Hayton ............... H04L 63/0815 726/8 |
| 2012/0011509 A1* | 1/2012 | Husain ................. G06F 9/5088 718/1 |
| 2012/0047130 A1* | 2/2012 | Perez ........................ G06F 8/34 707/723 |
| 2012/0054265 A1 | 3/2012 | Kazerani et al. |
| 2012/0092277 A1 | 4/2012 | Momchilov |
| 2012/0117497 A1* | 5/2012 | Uola ......................... G06F 9/451 715/762 |
| 2013/0117359 A1* | 5/2013 | Husain .................... H04L 67/34 709/203 |
| 2014/0020083 A1 | 1/2014 | Fetik |
| 2014/0214922 A1* | 7/2014 | Kim ..................... H04L 63/102 709/203 |
| 2014/0304407 A1 | 10/2014 | Moon |
| 2015/0082179 A1 | 3/2015 | Ayanam et al. |
| 2015/0113528 A1* | 4/2015 | Kim ......................... G06F 9/452 718/1 |
| 2015/0121369 A1* | 4/2015 | Thankappan ....... G06F 9/45533 718/1 |
| 2015/0163206 A1* | 6/2015 | McCarthy ........... G06F 21/6227 713/171 |
| 2015/0256475 A1 | 9/2015 | Suman et al. |
| 2015/0295992 A1* | 10/2015 | Kruglick ............. G06F 3/04847 715/740 |
| 2015/0297776 A1* | 10/2015 | Conroy ................. G06Q 10/08 239/11 |
| 2015/0310188 A1* | 10/2015 | Ford ....................... G06F 21/10 726/28 |
| 2015/0341212 A1* | 11/2015 | Hsiao .................. H04L 41/0813 715/735 |
| 2015/0350031 A1* | 12/2015 | Burks ..................... H04L 41/22 715/736 |
| 2015/0363190 A1* | 12/2015 | Bhatia ................... G06F 3/0482 717/172 |
| 2016/0261564 A1 | 9/2016 | Foxhoven et al. |
| 2016/0337426 A1 | 11/2016 | Shribman et al. |
| 2016/0359680 A1 | 12/2016 | Parandehgheibi et al. |
| 2017/0208138 A1* | 7/2017 | Baxter .................... H04L 67/16 |
| 2017/0235817 A1 | 8/2017 | Deodhar et al. |
| 2019/0349254 A1 | 11/2019 | Nolan et al. |
| 2019/0349426 A1 | 11/2019 | Smith et al. |

OTHER PUBLICATIONS

Russ "Efficient caching of versioned JavaScript, CSS and image assets for fun and profit", published on May 18, 2009, https://web.archive.org/web/20120518020237/http://2tap.com/2009/05/18/efficient-caching-of-versioned-javascript-css-and-image-assets-for-fun-and-profit/ (Year: 2009).*

Wikipedia, "OAuth", Nov. 12, 2017, 8 pages.

U.S. Appl. No. 15/826,658, filed Nov. 29, 2017, 68 pages.

Non-Final Office Action dated Oct. 4, 2018 for related U.S. Appl. No. 15/006,416, 11 pages.

Notice of Allowance dated Aug. 28, 2019 for related U.S. Appl. No. 15/006,416.

Cano, I. et al., "Curator: Self-Managing Storage for Enterprise Clusters", 14th USENIX Symposium on Networked Systems Design and Implementation, NSDI '17, (Mar. 27, 2017).

Notice of Allowance dated Feb. 19, 2019 for related U.S. Appl. No. 16/200,525.

Final Office Action dated May 2, 2019 for related U.S. Appl. No. 15/006,416, 12 pages.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

* cited by examiner

ARCHITECTURE FOR IMPLEMENTING USER INTERFACES FOR CENTRALIZED MANAGEMENT OF A COMPUTING ENVIRONMENT

CROSS-REFERENCE TO RELATED APPLICATIONS

The present application claims the benefit of priority to U.S. Provisional Application Nos. 62/108,520 and 62/108,515, both filed on Jan. 27, 2015, which are hereby incorporated by reference in their entirety. The present application is also related to U.S. application Ser. No. 15/006,416, entitled "ARCHITECTURE FOR IMPLEMENTING CENTRALIZED MANAGEMENT FOR A COMPUTING ENVIRONMENTL", filed on even date herewith, which is hereby incorporated by reference in its entirety.

BACKGROUND

Administrators are often needed to ensure the proper functioning and management of modern computing systems. To provide this administrative functionality, many enterprise and organizational data centers provide management console interfaces having a set of interface elements to display status information and/or to provide operational controls over various aspects of the computing system.

In large computing environments having multiple underlying systems that need to be managed, there may be any number of individual nodes/systems/clusters (which may collectively be referred to herein as a "node"), where each of these individual nodes/systems/clusters is managed by its own management console interface. Since the individual systems/clusters may differ from one another, it is possible that the management console interface will likewise be different as well. One cause of this is if the individual nodes/systems/clusters correspond to different computer/software/hardware products. Even if the systems correspond to the same product, it is possible that they relate to different versions of the product, and hence the management console interface will also differ in terms of its versioning—resulting in basic incompatibilities in terms of functionality, user interfaces, and APIs (application programming interfaces).

To efficiently manage the computing environment, it would be very helpful to allow administrators at a centralized management console to manage each of the individual nodes/systems/clusters. The problem is that, as noted above, some or all of the underlying systems within the computing environment may correspond to different types and/or versions of its management console interface.

To address this issue, one possible approach is to allow the administrator to use the user interface for the centralized management console to access and manage the pertinent functionality of each of the local nodes. However, the drawback with this approach is that, due to the different types and/or versions of the management console user interfaces, there may exist incompatibilities between the UI at the central node and the UI at the local nodes.

Another approach is to configure the central UI to include the required functionality of all of the local node UIs. The drawback with this approach is that the central UI very quickly becomes a nightmare to maintain, given that the central console code must be created to include all possible types and variants of the underlying local management UIs that it may ever need to emulate. In addition, bloating out the codebase for the centralized management console will likely cause diminished performance and greater latency for the user interface (e.g., due to a large number of conditional logic that must be put into place to handle the multitude of different underlying console options). Moreover, this approach is not forwards compatible, so that a compatibility problem may occur if an underlying system has a later version of management code as compared to the centralized management console.

Therefore, there is a need for an improved approach to implement a management infrastructure for computing environments.

SUMMARY

According to some embodiments, the present disclosure provides an improved approach to implement a management infrastructure for computing environments. The invention provides the ability to cache the user interfaces for local management nodes at a central management node. The cached copies of the local node UIs can then be executed as if the user was actually operating from the local node.

In some embodiments, the present disclosure provides an improved approach to implement a management infrastructure for computing environments. The invention provides the ability to implement a centralized management console interface that can adaptably handle any type or version of management console for underlying systems.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

DETAILED DESCRIPTION OF THE EMBODIMENTS OF THE INVENTION

Figure 1:
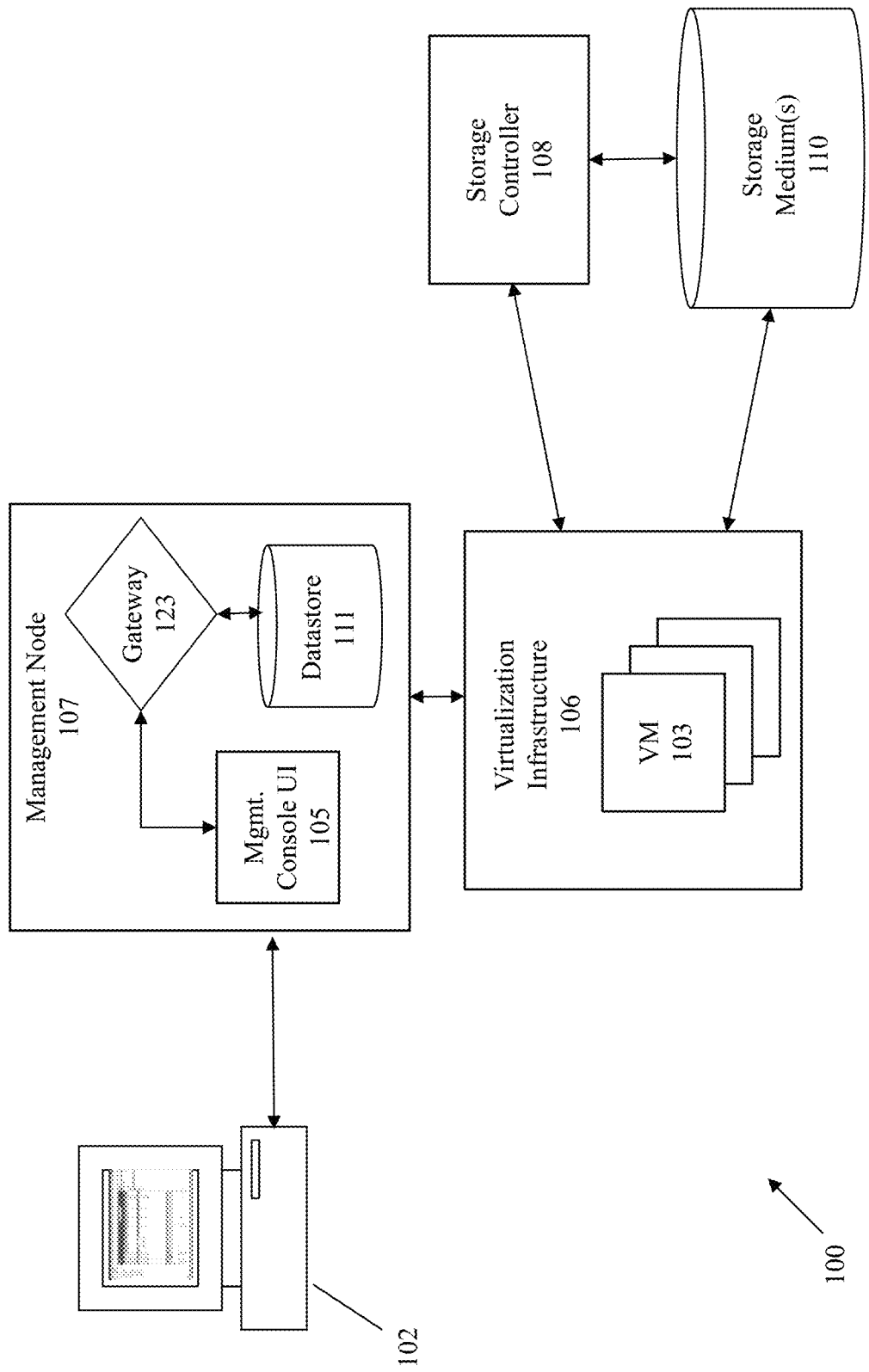
FIG. 1 illustrates a system to implement a virtualization management console according to some embodiments of the invention.

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material or characteristic described in connection with the embodiments is included in at least one embodiment. Thus, the appearances of the phrase "in some embodiments" or "in other embodiments", in various places throughout this specification are not necessarily referring to the same embodiment.

In some embodiments, the present disclosure provides an improved approach to implement a management infrastructure for computing environments. The invention provides the ability to cache the user interfaces for local management nodes at a central management node. The cached copies of the local node UIs can then be executed as if the user was actually operating from the local node.

In other embodiments, the present disclosure provides an improved approach to implement a management infrastructure for computing environments. The invention provides the ability to implement a centralized management console interface that can adaptably handle any type or version of management console for underlying systems. To illustrate the embodiments of the invention, various embodiments will be described in the context of a management environment for the storage infrastructure of a virtualization system. It is noted, however, that the invention is applicable to other types of systems as well, and is therefore not limited to virtualization systems and storage infrastructures unless explicitly claimed as such. Indeed, the invention is applicable to any operating system or application abstraction, and is not limited in any way only to virtualization systems.

To illustrate the embodiments of the invention, various embodiments will be described in the context of a management environment for the storage infrastructure of a virtualization system. It is noted, however, that the invention is applicable to other types of systems as well, and is therefore not limited to virtualization systems and storage infrastructures unless explicitly claimed as such. Indeed, the invention is applicable to any operating system or application abstraction, and is not limited in any way only to virtualization systems.

By way of background, a "virtual machine" or a "VM" refers to a specific software-based implementation of a machine in a virtualization environment, in which the hardware resources of a real computer (e.g., CPU, memory, etc.) are virtualized or transformed into the underlying support for the fully functional virtual machine that can run its own operating system and applications on the underlying physical resources just like a real computer. Virtualization works by inserting a thin layer of software directly on the computer hardware or on a host operating system. This layer of software contains a virtual machine monitor or "hypervisor" that allocates hardware resources dynamically and transparently. Multiple operating systems run concurrently on a single physical computer and share hardware resources with each other. By encapsulating an entire machine, including CPU, memory, operating system, and network devices, a virtual machine is completely compatible with most standard operating systems, applications, and device drivers. Most modern implementations allow several operating systems and applications to safely run at the same time on a single computer, with each having access to the resources it needs when it needs them.

Virtualization allows multiple virtual machines to run on a single physical machine, with each virtual machine sharing the resources of that one physical computer across multiple environments. Different virtual machines can run different operating systems and multiple applications on the same physical computer. One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine is not utilized to perform useful work. This is wasteful and inefficient if there are users on other physical machines which are currently waiting for computing resources. To address this problem, virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

Virtualization systems have now become a relatively common type of technology used in many company and organizational data centers, with ever increasing and advanced capabilities being provided for users of the system. However, the ability of company administrators to manage these virtualizations systems have thus far not kept up with the rapid advances made to the underlying systems themselves.

As noted above, one area where this issue is particularly noticeable and problematic is with respect to the desire to implement centralized management of multiple underlying systems in a greater computing environment involving virtualization.

FIG. 1 illustrates a system 100 to implement a virtualization management console UI 105 from a management node 107 according to some embodiments of the invention. The system 100 includes one or more users at one or more user stations 102 that use the system 100 to operate the virtualization system 100 and/or management console UI 105.

The user station 102 comprises any type of computing station that may be used to operate or interface with the system 100. Examples of such user stations include, for example, workstations, personal computers, or remote computing terminals. The user station 102 comprises a display device, such as a display monitor, for displaying a user interface to users at the user station. The user station 102 also comprises one or more input devices for the user to provide operational control over the activities of the system 100, such as a mouse or keyboard to manipulate a pointing object in a graphical user interface.

System 100 includes virtualization infrastructure 106, comprising any processing components necessary to implement and provision one or more VMs 103. This may include management components to obtain status for, configure, and/or control the operation of one or more storage controllers 108 and/or storage mediums 110. Data for the VMs 103 are stored in a tangible computer readable storage device 110. The computer readable storage device 110 comprises any combination of hardware and software that allows for ready access to the data that is located at the computer readable storage device 110. The storage controller 108 is used to manage the access and operation of the computer readable storage device 110. While the storage controller is shown as a separate component in this figure, it is noted that any suitable storage controller configuration may be employed. For example, in some embodiments, the storage controller can be implemented as a virtual machine as described in more detail below. As noted in more detail below, the virtualization infrastructure 106 may correspond to a cluster of multiple nodes that are integrated as a single system.

System 100 includes a management console UI 105. The management console UI 105 provides an interface that permits an administrator to manage and administer the operation of the system. According to some embodiments, the management console 105 can be executed to display a management user interface within a web browser at the user station 102. In one embodiment, the storage controller exposes an API or GUI to create, read, update, delete (CRUD) datastores at the computer readable medium 110, which can be managed by the management console 105.

In operation in some embodiments, a web browser at the user station 102 is used to display a web-based user interface for the management console. The management console 105 corresponds to any materials that are necessary or usable to implement the user interface, such as JavaScript code, CSS (cascading style sheet) content, and image files. Metadata regarding the system 100 is maintained at a datastore 111, which collects data relating to the virtualization infrastructure 106, the storage mediums 110, and/or datastores at the storage mediums. The user interface materials interacts with a gateway 123 to obtain the metadata to be displayed in the user interface. In some embodiments, the gateway comprises a web server and servlet container, e.g., implemented using Apache Tomcat.

Figure 2:
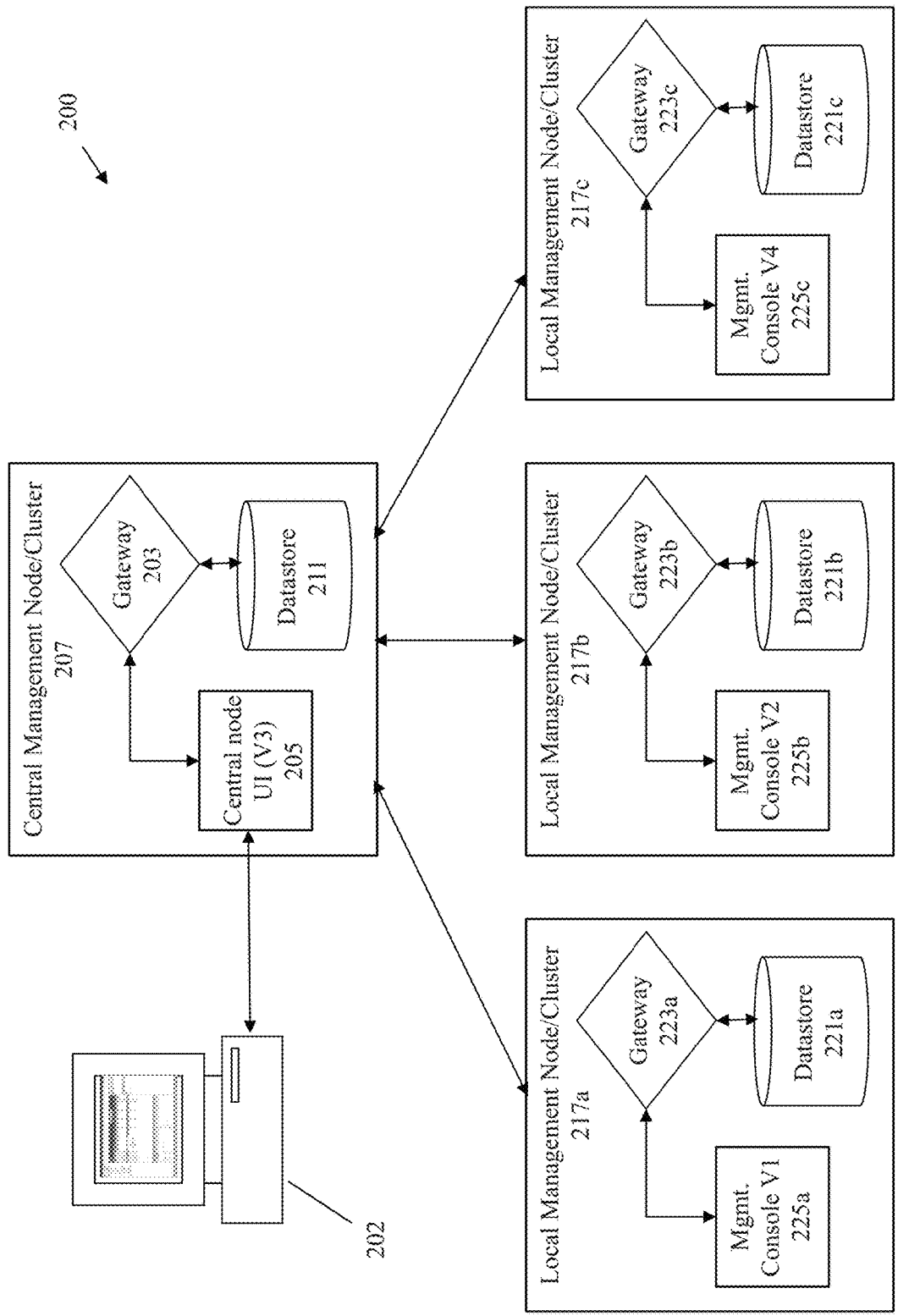
FIG. 2 illustrates a computing environment having multiple underlying systems/clusters that need to be managed, where a separate management node exists for each of the underlying systems/clusters.

FIG. 2 illustrates a larger computing environment having multiple underlying systems/clusters that need to be managed, where a separate local management node exists for each of the underlying systems/clusters. Shown in this figure are local management nodes 217a, 217b, and 217c. Each of these local management nodes includes its own management console UIs 225a-c, gateways 223a-c, and datastore 221a-c. It is noted that the term "node" is used herein to refer to any entity or collection of entities that can be used to perform the described management functionalities. Examples of suitable nodes include a single hardware node, a logical software-based node, a virtual machine, a process, a thread, or a clustered set of any of the previously listed entities.

In a large computing environment, the individual systems/clusters may differ from one another such that the management console interface code will likewise be different as well. In this illustrated scenario, the different nodes may correspond to different versions of the software used to implement the underlying system. As such, it is possible that there are different versions of the management console UI code for each of the management nodes.

To efficiently manage the computing environment, a central management node 207 is provided to manage nodes 217a, 217b, and 217c. The problem is that some or all of the underlying nodes 217a, 217b, and 217c within the computing environment correspond to different types and/or versions of its management console interface UI from the central management node 207. Here, the central node UI 205 at the central management node is at version 3, whereas nodes 217a is at version 1, node 217b is at version 2, and node 217c is at version 4. As previously noted, this may result in basic incompatibilities between the UI code at the central management node from the UI materials 225a-c at the local nodes 217a-c, e.g., in terms of functionality, user interfaces, and APIs (application programming interfaces). For example, the API used by the JavaScript code on the different management consoles could have variations such as different key/value pairs or new and/or obsolete URL structures, resulting in incompatibility.

To address this issue, one possible approach is to build the centralized UI code with conditional logic such that it essentially includes the pertinent functionality of all of the underlying UI materials 225a-c. However, this approach is not very scalable since it is very difficult to maintain, causes diminished performance and greater latency for the user interface due to the large number of conditional if-then logic that must be put into place to handle the different underlying console options, and may not be forward compatible if the UI materials for a local node is later than the code version at the central management console.

Embodiments of the invention provide an alternate approach that solves these problems. Instead of attempting to build all of the functionality of the local node's UI materials into the central node's UI materials, the invention will grab the local UI materials, cache it, and render it in a container on the user interface that is run from the central management node. A gateway 203 is employed at the central management node 207 to proxy requests to the local nodes, with data stored in the datastore 211.

UI Caching

Embodiments of the invention provide an approach that caches the user interfaces for local management nodes at a central management node. The cached copies of the local node UIs can then be executed as if the user was actually operating from the local node.

Figure 3:
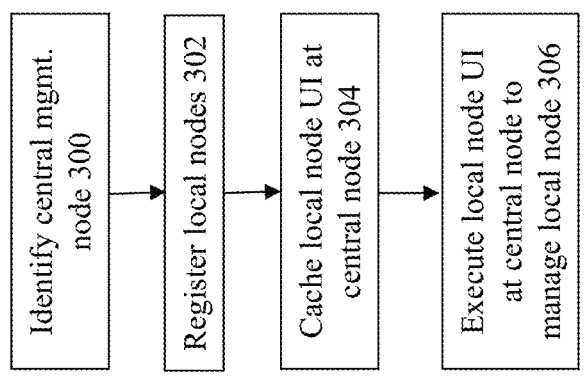
FIG. 3 shows a flowchart of an approach to implement some embodiments of the invention.

FIG. 3 shows a flowchart of an approach to implement some embodiments of the invention. At 300, identification is made of a central management node. Any suitable approach can be taken to identify the central management node. In some embodiments, an election process can be performed to elect one of the distributed nodes as the central management node. This may occur, for example, at system start-up time, or when the previously identified central management node can no longer serve in that role (e.g., because it undergoes a failure, needs to shut down for maintenance or upgrade, etc.).

At 302, the local management nodes are registered with the central management node. This involves updating mapping information that is maintained that indicates the UI version that corresponds to each registered local management node.

In some embodiments, a copy of the registration information is maintained at a centralized and/or distributed metadata repository. If the central management node fails and a new central management node is elected, then the new central management node can more expeditiously perform the registration process by accessing the saved copy of the previous registration information.

At 304, a copy of the UI version from the local node is placed at the central node. This action involves the placement of the complete local node UI within a cache at the central node. In some embodiments, if multiple local nodes share the same UI version, then only a single copy of the same base UI needs to be cached at the central node.

There are many ways to implement this action of building a complete copy of the local node UIs at the central node. In one embodiment, the registration step causes the immediate copying of all UI components to the cache at the central node. In another possible approach, a lazy copying may occur where the UI versions are copied to the central node over time. In yet another approach, the copying for a particular version of the local node UI occurs at the time that a user at the central node actually makes the request to access that UI at a local node and it is determined that a cached copy does not yet exist.

At 306, the cached copy of the local node UI can then be executed by the user at the central node. This makes it appear like the UI is operationally executing just as if the user was at the local node, even though the user is actually at the central node. As discussed in more detail below, the requests at the central node are proxied to the local node to be handled.

Figure 4A:
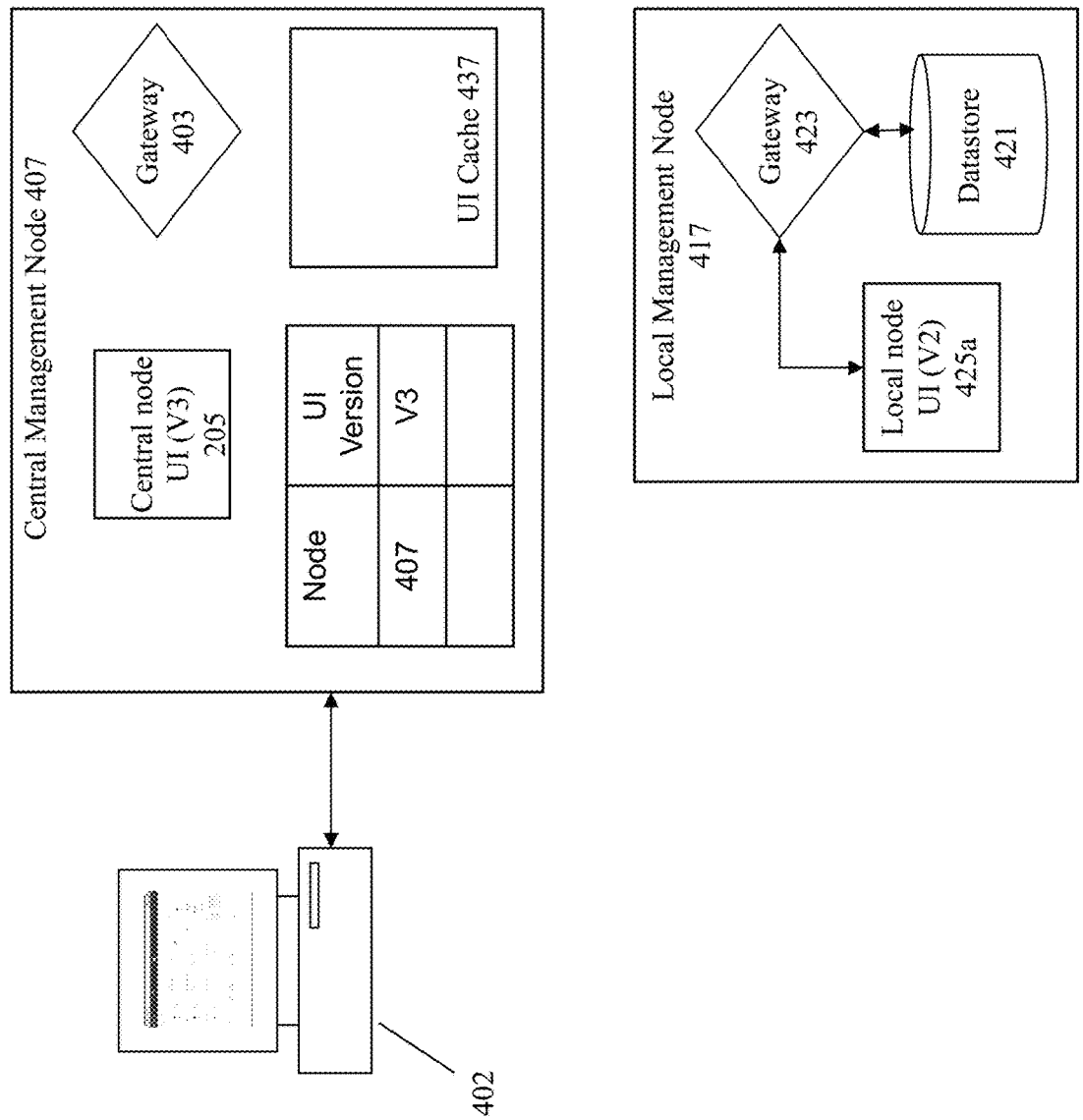
FIGS. 4A-F provide an illustrative example for this approach according to some embodiments.

FIGS. 4A-F provide an illustrative example for this approach according to some embodiments. FIG. 4A shows the situation when the central management node 407 has just been elected. Here, registration has not yet been performed, and therefore the central management node 407 does not yet know of the exact version being used at the local management node 417.

Figure 4B:
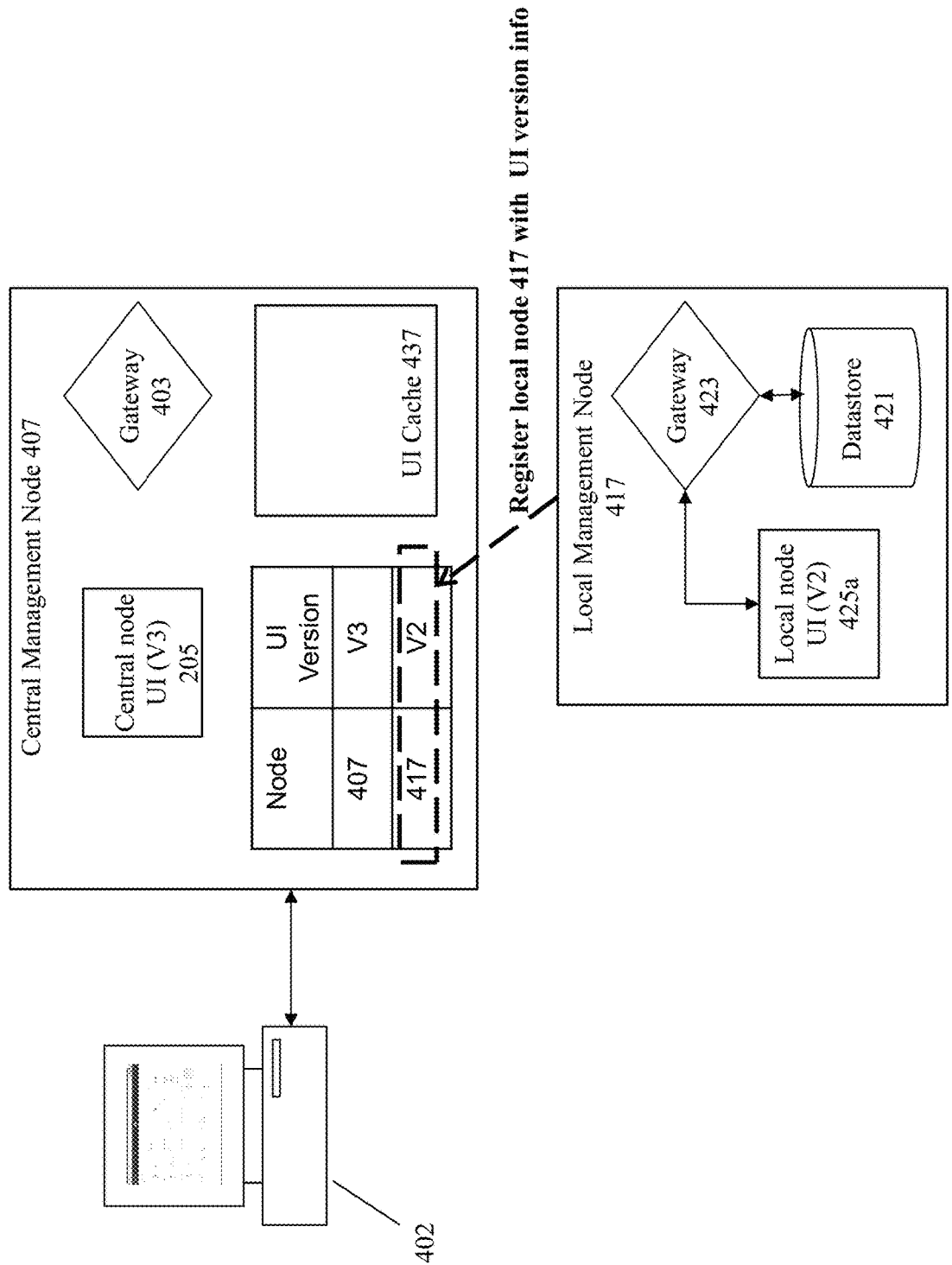

FIG. 4B illustrates the registration process. Registration is performed to identify the specific version number of the UI code being run at the local node 417. Here, a data structure at the central management node 407 is updated to include this information. In this example, the central management node 407 is operating at version 3 whereas the local node 417 is running at a different version (version 2).

Figure 4C:
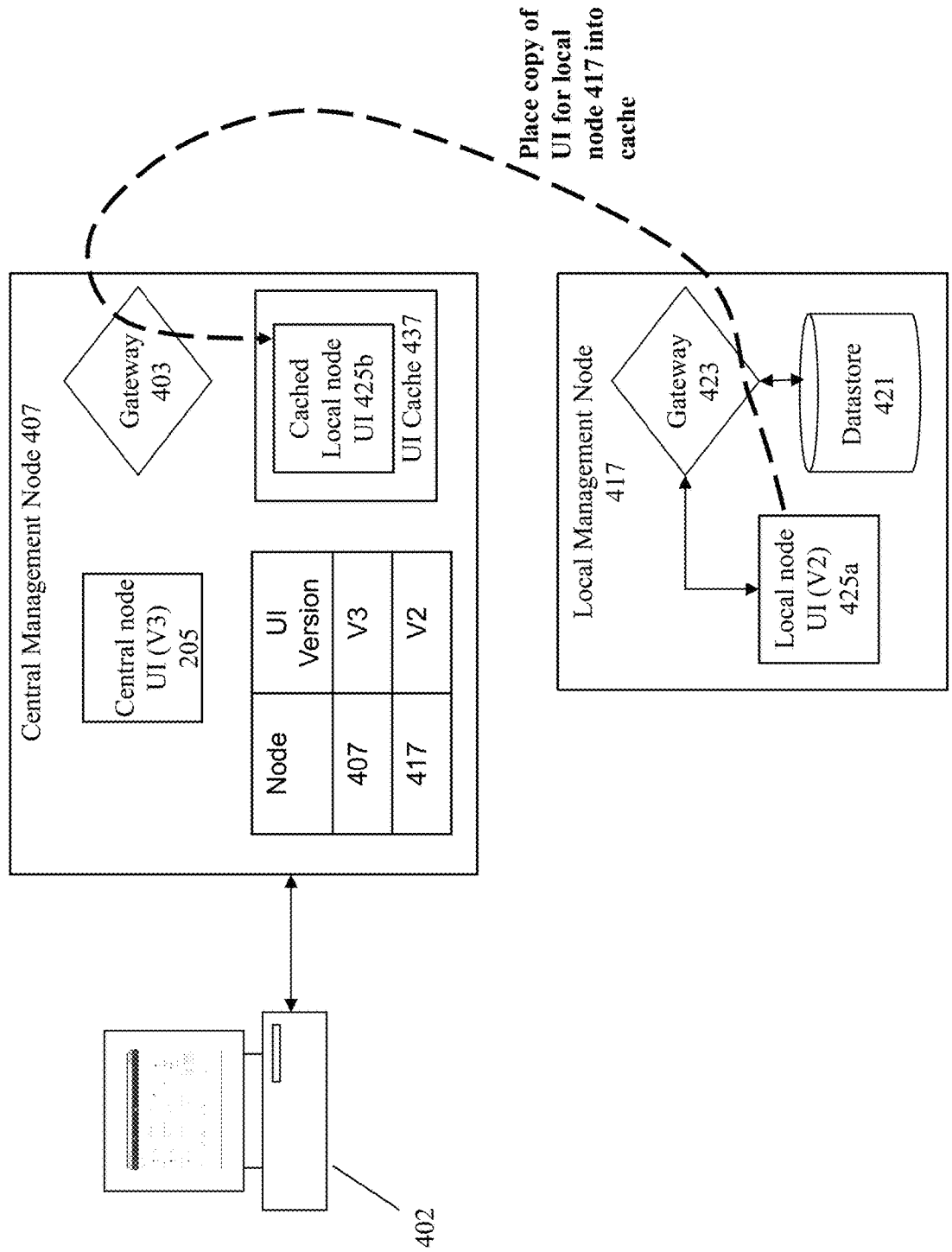

FIG. 4C, a copy of the local node UI 425*a* from the local node 417 is placed at within a cache 437 at the central node 407. This action involves making a copy 425*b* of the complete local node UI 425*a* within the cache 437 at the central node 407. All pertinent components of the UI can be placed into the cache, including for example, CSS files, JavaScript files, and HTML, files.

A proxy can be used to build the completeness for the cached UI at the central node, where a gateway 403 at the central node 407 communicates with a gateway 423 at the local node 417 to handle the requests for the UI contents. Any suitable gateway may be used to perform these actions, e.g., where the gateway comprises a web server and servlet container implemented using Apache Tomcat.

Figure 4D:
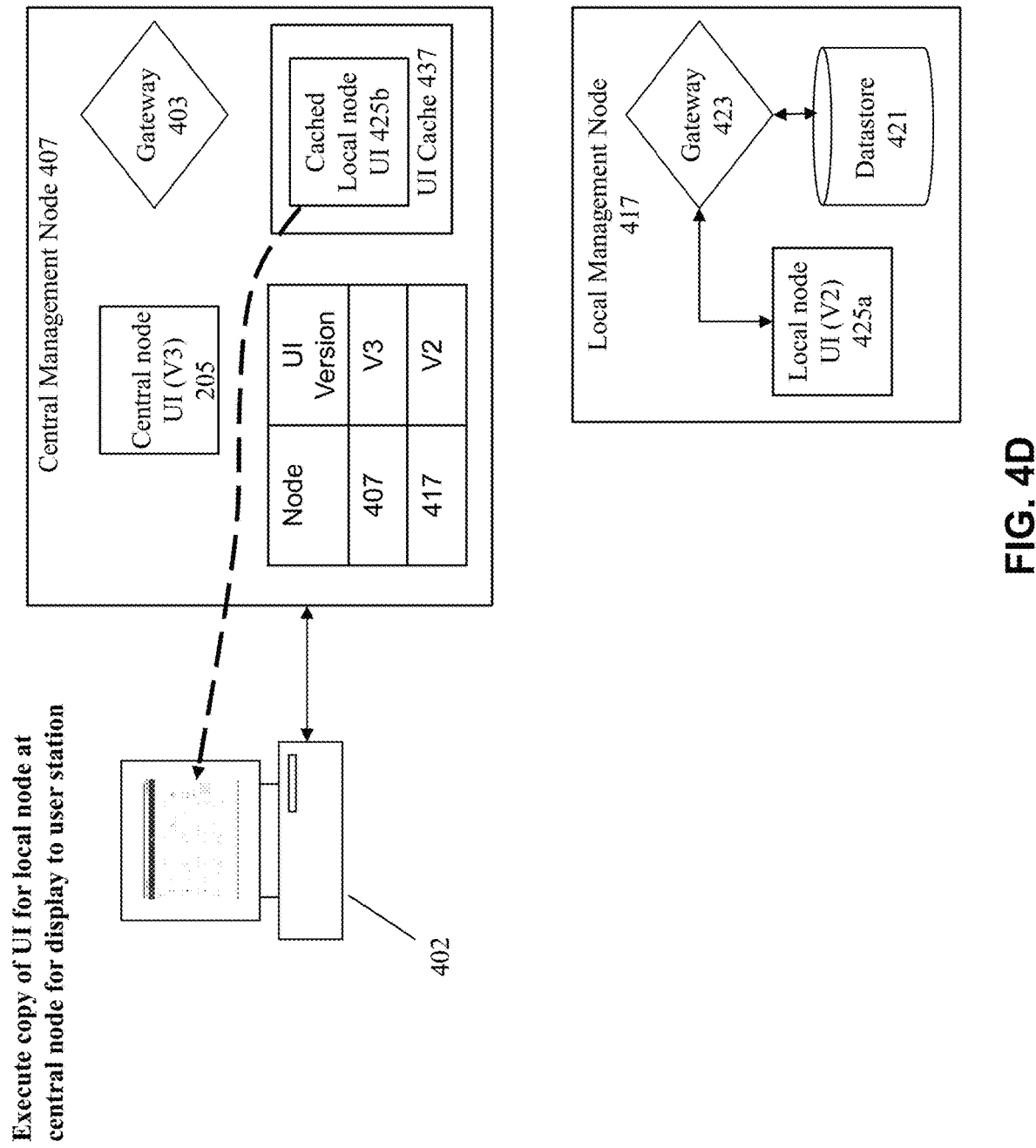

As shown in FIG. 4D, at some point in time, an administrator may seek to run the management console UI for the local node 417. Unlike prior approaches, the present invention permits the administrator at user station 402 to run the cached local node UI 425*b* at the central node 407 (rather than having to run the UI from the local node itself).

Figure 4E:
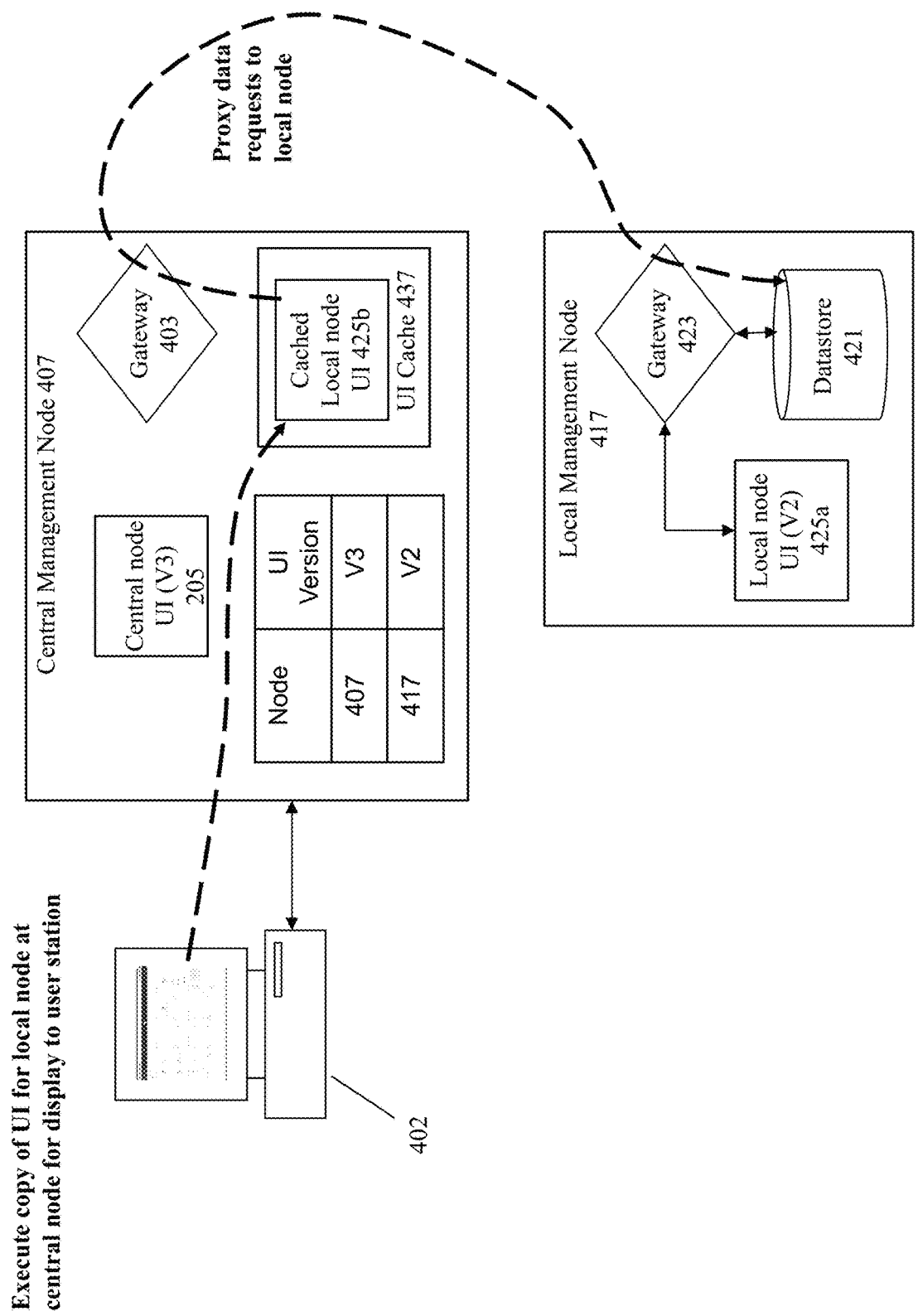

As shown in FIG. 4E, the requests for data are proxied through gateway 403 at central node 407 to the gateway at local node 417. This means that any requests from the cached UI 425*b* executing at the central management node 407 will be acted upon by the local node 417 as if it is locally being executed. This includes any request to obtain data content that may be stored in datastore 421 for which there is a desire to display that data on the UI at user station 402.

Figure 4F:
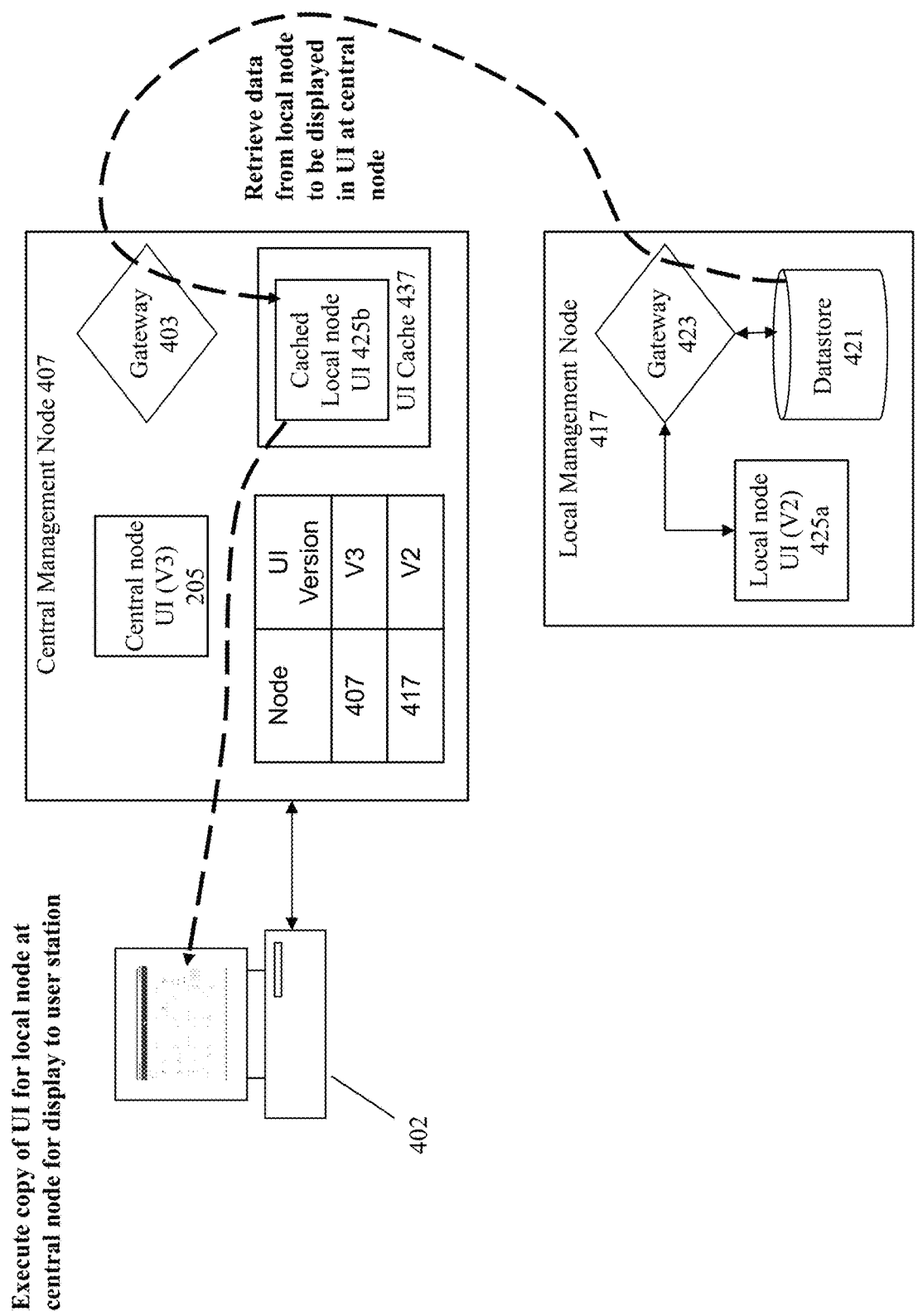

As shown in FIG. 4F, results are sent through gateway 423 to the gateway 403 and then used to populate the user interface displayed at the user station 402. This produces, for example, a display of dashboards within the UI 425*b* at user station 402 that is populated by data retrieved from datastore 421.

This approach therefore allows any local UI to be executed by the user, without requiring the user to actually navigate to the local node. Instead, the local node UI is run from a central node with requests from the UI proxied through gateways to the local node for data handling.

Figure 5:
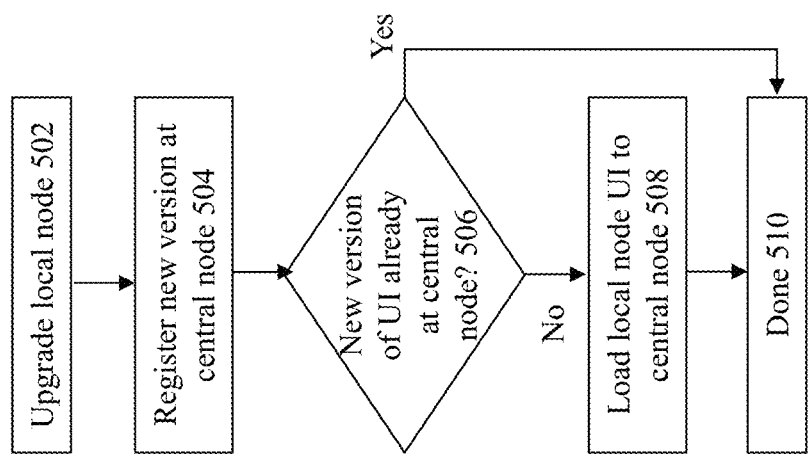
FIG. 5 shows a flowchart of an approach to handle distributed nodes that undergo an upgrade to a different version of the code on that node.

At some point, one or more of the distributed nodes may undergo an upgrade to a different version of the code on that node. FIG. 5 shows a flowchart of an approach to handle this situation. At 502, the local node is upgraded, e.g., to a more recent version of the cluster and/or management console software.

At 504, the central management node is informed of the upgrade by the local node. At this point the central node will make a decision of the exact course of action to take with respect to the local node upgrade.

In one embodiment, the central node will check, at 506, whether a cached copy of the new software is already cached at the central node. If so, then nothing further needs to be done and the process ends at 510.

However, if the central node does not already include a cached copy of the new version contents, then at 508, the contents are retrieved and cached at the central node. This can occur by immediately retrieving the complete set of contents for the new version. Alternatively, the contents can be retrieved at the time of need by the user. In yet another embodiment, a lazy arrangement can be implemented to retrieve the contents over time.

In some embodiments, the version contents can be retrieved from any suitable node, and not necessarily the specific node that had just been upgraded. For example, another node that is located closer in proximity to the central node may be designated as the node from which the contents are retrieved, even if that node was not the one that had just been upgraded.

Figure 6:
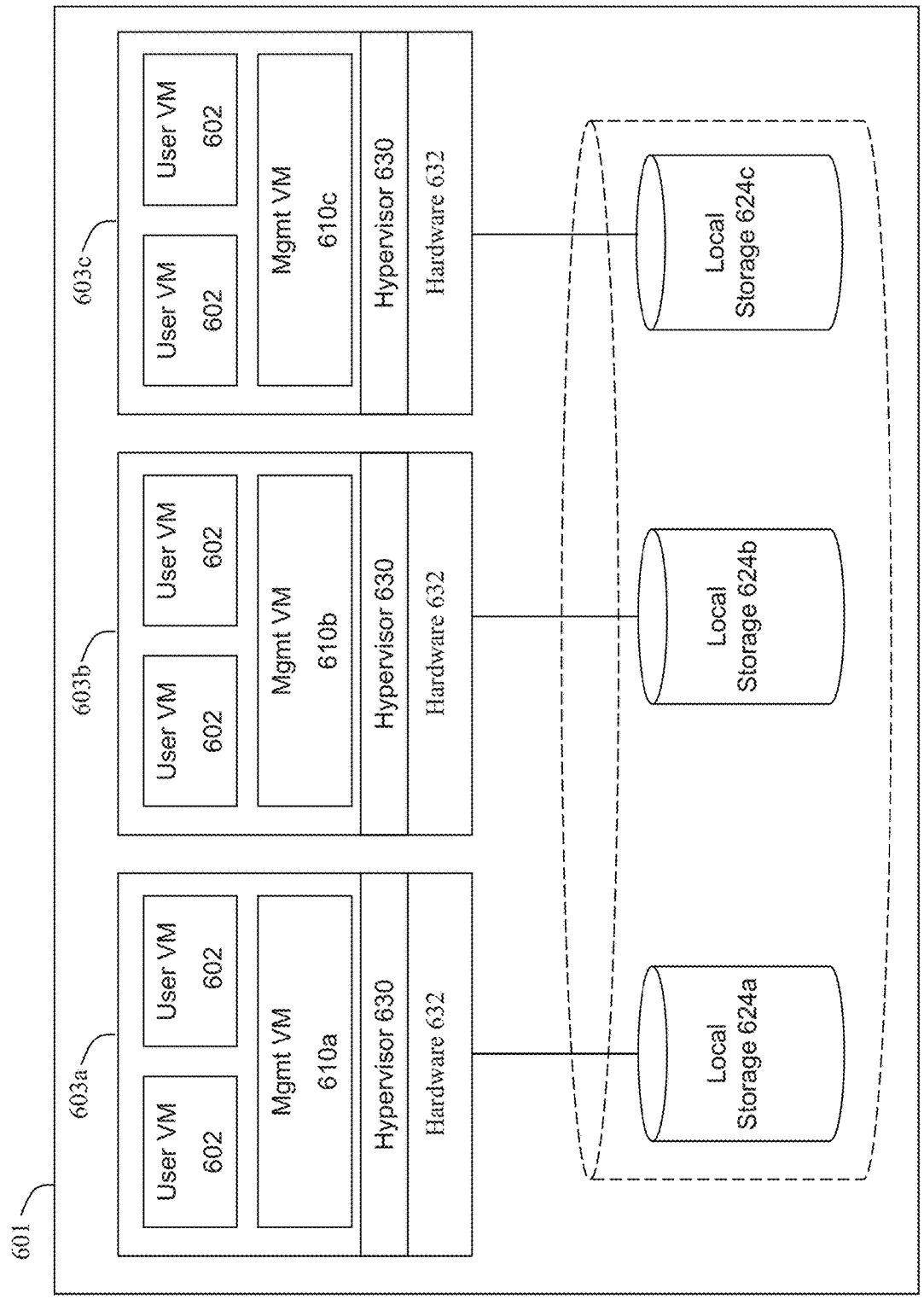
FIG. 6 illustrates an example approach to implement clustering in conjunction with the management nodes.

As previously noted, the management entities described above may be embodied as virtual machines within a clustered virtualization system. As shown in FIG. 6, a cluster 601 may include a plurality of physical nodes 603*a*, 603*b*, and 603*c*. Each of the physical nodes includes a set of underlying hardware 632, such as a central processing unit (CPU) and memory. A hypervisor 630 is provided on the node to implement virtualization. Various virtual machines may be implemented using the hypervisor 630. For example, a management virtual machine 610 (also referred to as a controller virtual machine or a service virtual machine) is provided on each node to perform management functionality. Each node may also include one or more additional user virtual machines 602 to provide user functionality, e.g., as virtual desktops for VDI (virtual desktop infrastructure) applications.

It is the management virtual machine 610 that include the software to perform the management functionality described above (e.g., management console functionality and gateway functionality). Each of the nodes may include its own management virtual machine 610. For example, node 603a includes a management virtual machine 610a, node 603b includes a management virtual machine 610b, and node 603c includes a management virtual machine 610c.

In a clustered arrangement, each cluster may include one of the management virtual machines as the active management node, to perform the management and data collection functions on behalf of the devices within that cluster. For example, the management virtual machine 610a may currently be the active local management node for cluster 601, taking on the duties to interface with the central management node. However, upon a detected failure of the active local management node or active management virtual machine 610a, one of the other management virtual machines 610b or 610c could assume the responsibility to be the new active management virtual machine (e.g., through an election process).

This is implemented by making sure that a true clustering environment is implemented, where sharing of resources occurs such that the metadata necessary to be accessed by the management virtual machine is assessable to any of the nodes that potentially need to become the new local management node. In addition, the same software code functionality for performing local management duties can be located within each of the management virtual machines on each of the nodes.

A storage pool may be implemented that includes local storage from the different nodes, e.g., local storage 624a, 624b, and 624c from nodes 603a, 603b, and 603c, respectively. The contents of the storage pool may be collectively accessed and managed by the various nodes, where a common address space is imposed over the disparate local storage devices. The management virtual machines may be configured as virtual "storage controllers" to manage storage by the user virtual machines to the storage pool. The metadata accessible by the different management virtual machines may be stored within the storage pool, and thereby accessible by any of the management virtual machines that assumes the responsibility of becoming the local management node.

It is noted that this approach can also be taken to implement the central management node as well, where there are multiple entities within a cluster that potentially are capable of assuming responsibility as the central management node.

Render Local UI at Central Management Node

As previously noted, some embodiments of the invention provide an approach where, instead of attempting to build all of the functionality of the local node's UI content into the central node's codebase, the central management node will obtain the local UI content and render it in a container on the user interface that is run from the central management node.

Figure 8:
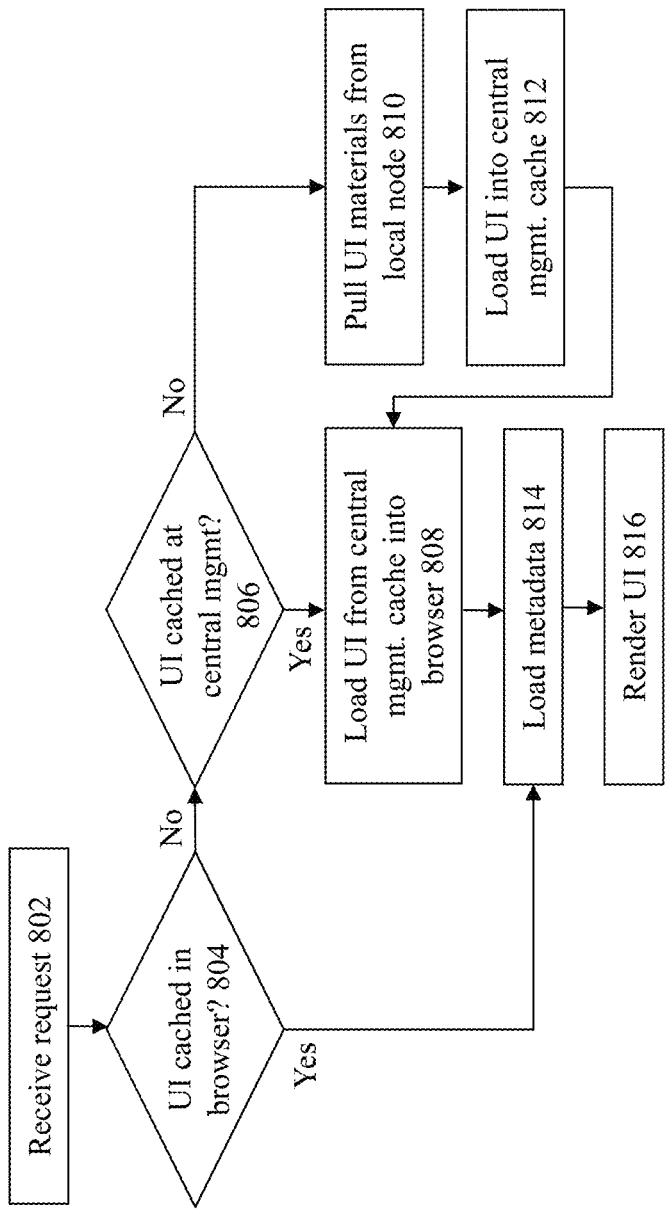
FIG. 8 shows a flowchart of an approach to implement some embodiments of the invention to load UI materials.

FIG. 8 shows a flowchart of an approach to implement some embodiments of the invention. At 802, a request is received to display a management UI to the user for a given node/cluster. This may occur, for example, when the user selects a cluster from a set of clusters on a drop-down menu.

A determination is made at 804 whether the specific UI version for that cluster is already within the browser cache. This situation may exist, for example, if the browser was previously used to display the same UI version, and therefore the materials for that UI version are already within the browser cache. If so, then at 814, the metadata for the desired cluster is loaded into the UI. The UI is then rendered at 816.

It is possible that the UI materials for the version of interest is not already within the browser cache. This situation may exist, for example, if the user was previously operating the management console for a different cluster that is using another version of the UI materials.

Therefore, at 806, a determination is made whether the UI materials are located at the cache at the central management node. The materials may have already been cached at the central management node using the techniques described above, e.g., based upon pre-registration of the materials and/or based upon previous loading of the UI materials for that UI version. If so, then at 808, the UI materials are loaded from the cache of the central management node. The metadata for the desired cluster is loaded into the UI at 814, and the UI is thereafter rendered at 816.

It is possible that the materials for the UI version of interest are not already cached at the central management node. This situation may exist for many reasons. For example, the system may not employ a pre-registration process, may not yet have run a pre-registration process even if it exists in the system, may not have previously loaded the same UI version in the past, and/or may have experienced cache eviction such that a previously-cached copy of the UI materials no longer exists in the cache of the central management node.

Therefore, at 810, the UI materials would be pulled from the local cluster of interest. At 812, those materials are placed into the cache of the central management node. At 808, the UI materials are then loaded into the browser. The metadata for the desired cluster is loaded into the UI at 814, and the UI is thereafter rendered at 816.

Figure 7:
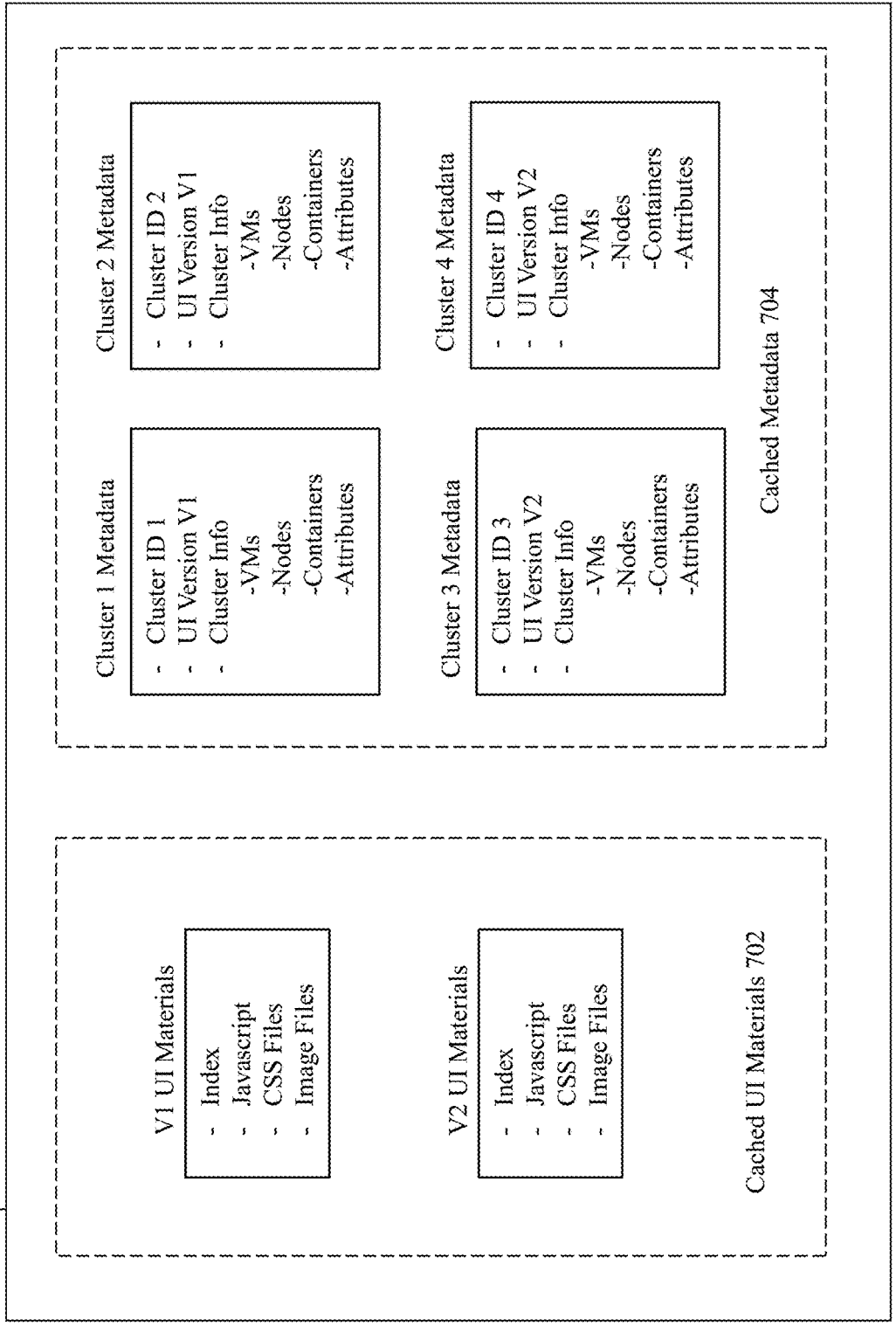
FIG. 7 illustrates at least some of the contents that may be included within a cache.

FIG. 7 illustrates at least some of the contents that may be included within a cache 700. The cache 700 may include cached UI materials 702 that can be used to render the UI. The UI materials include any materials that may be needed to render the base UI for a given UI version. For example, the UI materials may include an index of the materials, JavaScript files, CSS files, and image files. Each UI version would correspond to its own set of materials in the cache 700. As shown in this example, UI version 1 has its own set of materials separate from the materials for UI version 2.

The cache 700 may also include cached metadata 704 for the different clusters to be managed by the central management node. Each of the metadata for a cluster may identify the specific UI version that is appropriate for that cluster. This information can be used, for example, to identify which of the cached UI materials should be used to render the UI for that cluster.

The metadata will also include the necessary identifying information for the cluster to allow the central management node to be able to remotely connect to that cluster. Additional cluster information may be maintained for each cluster, including for example, the virtual machine in that cluster, the nodes in the cluster, and/or the storage containers for the cluster. Attributes for the cluster may also be maintained. This pertains, for example, to the fact that the different UI versions may display different sets of information about the clusters, and hence the different UI versions may correlate to different sets of metadata attributes. For example, a first UI version may include attribute information pertaining only to CPU and memory, while a second UI version may include attribute information pertaining to CPU, memory, and network usage.

It is noted that the two sets of content act differently within the browser, where the UI materials comprise static content that is the same for every local node that uses the same UI version. This includes, for example, the tabs, buttons, colors, images, etc, that is standard for the UI version. This static content is loaded the same way for every cluster that uses the same UI version. The other set of content pertaining the cluster-specific metadata would differ from one cluster to another, and therefore would be potentially be differently displayed in the UI.

Figure 9:
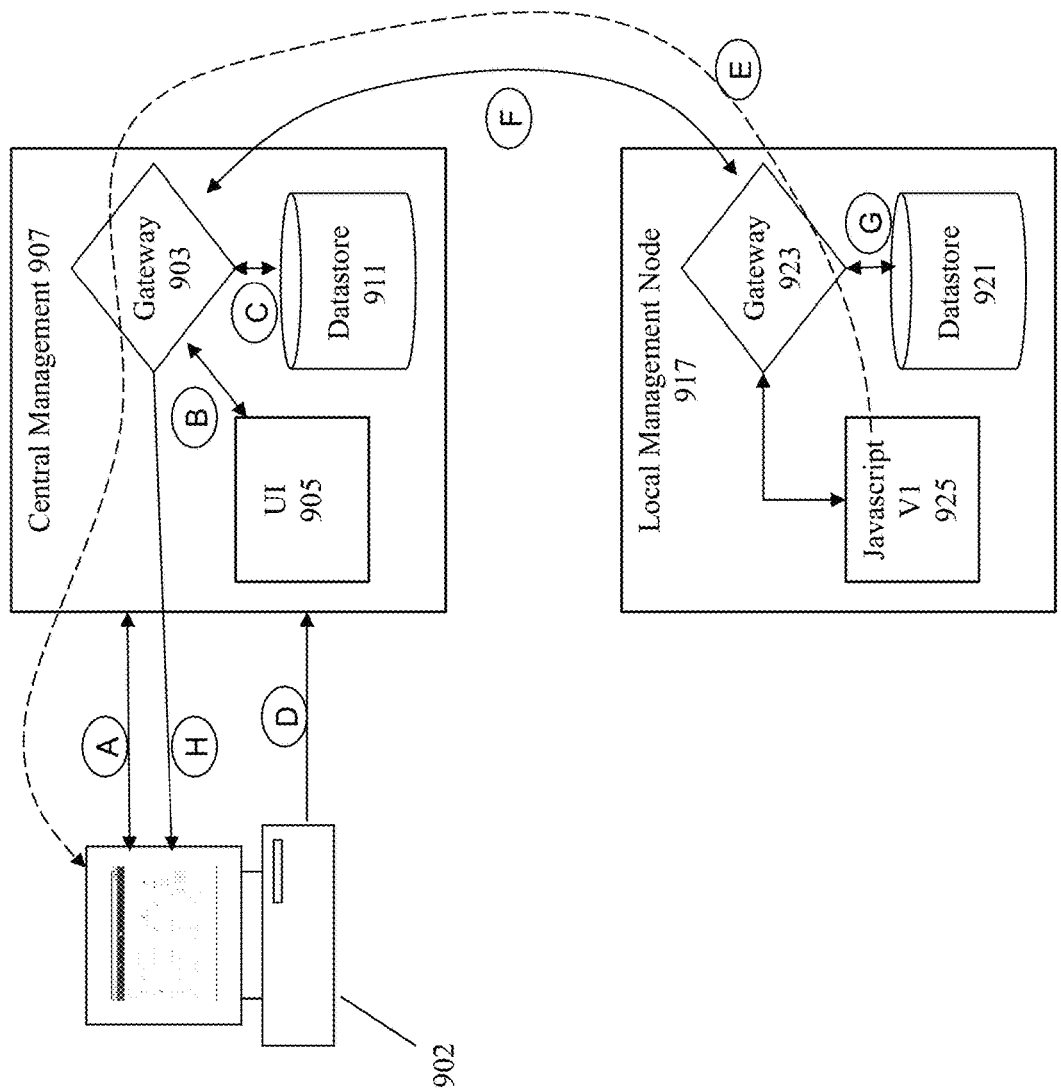
FIG. 9 illustrates a processing flow for some embodiments of the invention.

FIG. 9 provides an illustration of embodiments of the present invention. At step A, the user navigates to the appropriate URL address to open the central management console at the user station. At step B, the UI materials 905 from the central management node 907 is executed to render the UI at the user station (assuming that the materials are not already within the browser cache).

Figure 12:
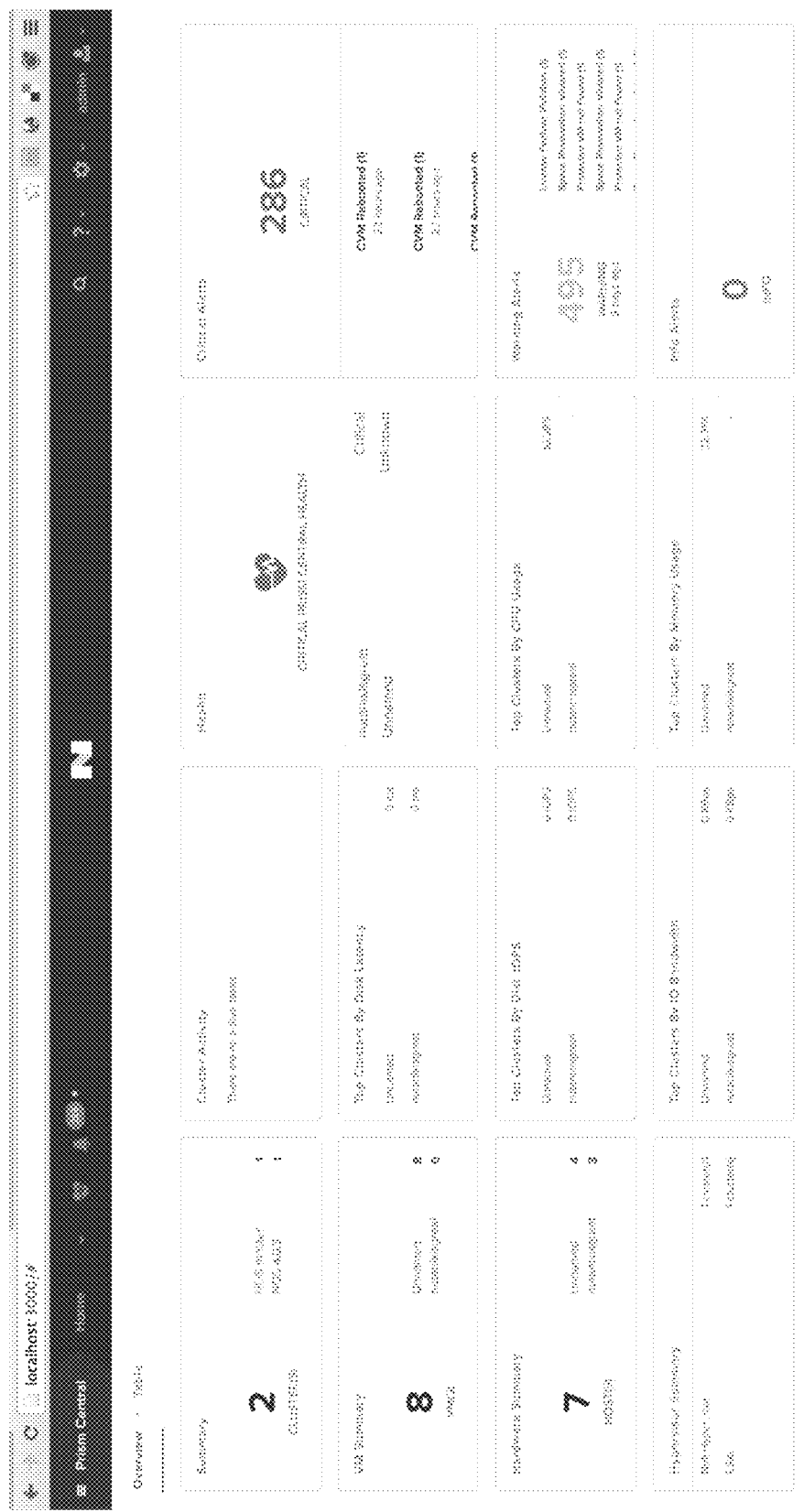
FIGS. 12, 13, and 14 illustrate example management interfaces according to some embodiments of the invention.

At step C, data is obtained from the datastore 911 to populate the user interface. FIG. 12 shows an example interface that may be used to present a high-level view of the entire computing environment from a central node, where summary information is provided for multiple underlying systems.

Figure 13:
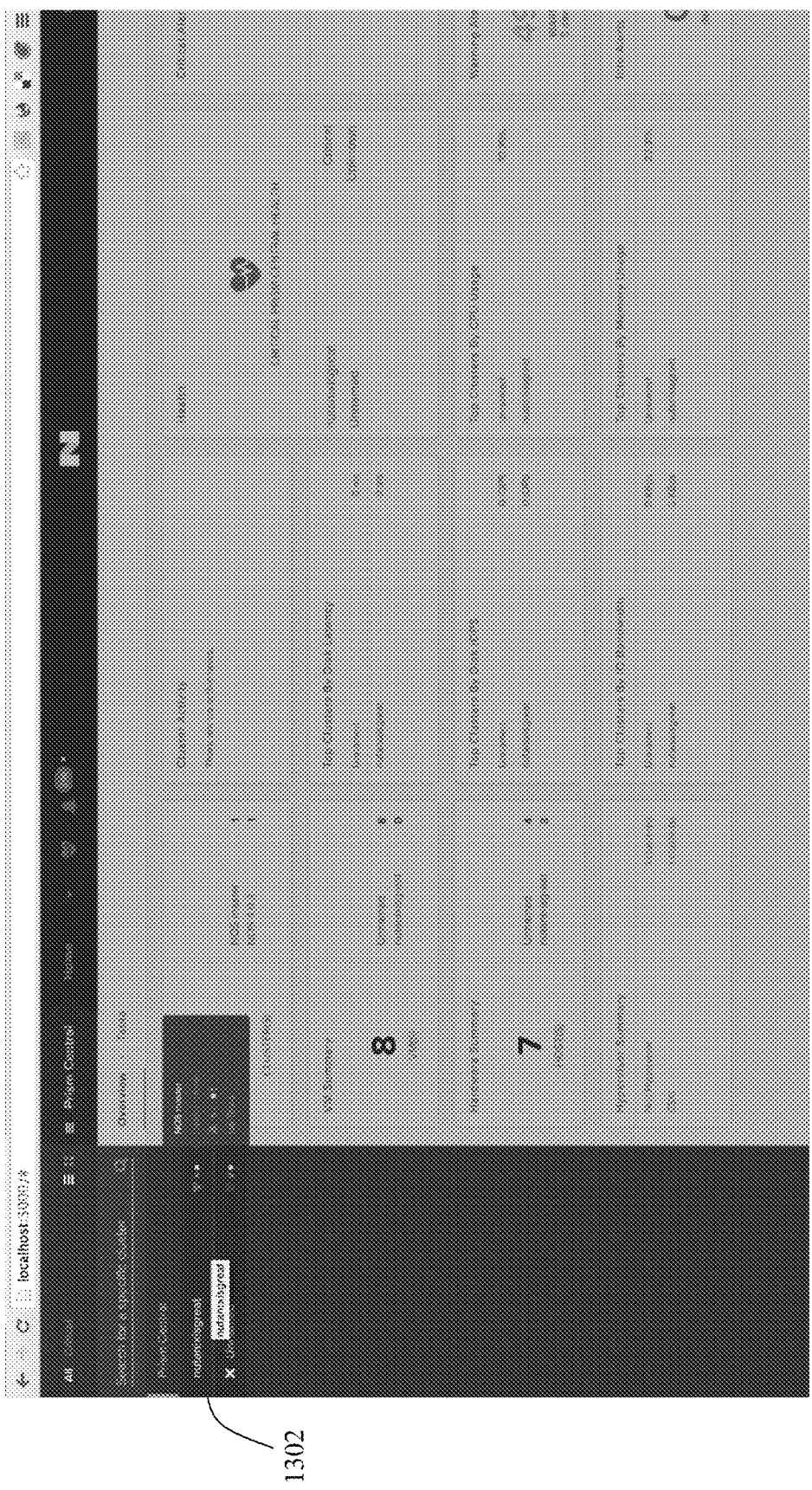

The user may control the interface to view a list of the underlying systems that may be individually managed using their own management console interfaces. FIG. 13 illustrates an example interface, where the left-hand portion of the interface provides a selectable list of such local systems.

At step D, the interface receives the user's selection of one of the items from the list. This may occur, for example, if the user double-clicks on one of the items in the list, e.g., where the user selects the management interface for node 917.

This results, at step E, in the UI materials 925 for local node 917 being executed and rendered within a container in the user interface. For example, an iframe can be used as this container to render the UI materials 925. At this point, the UI materials 925 (which is executing on 902) is not connecting directly to local node 917, but is instead connecting through central management node 907 (this aspect is illustrated by the dashed line rather than a solid line for step E in the figure).

At step F, the system will proxy all requests from the UI materials 925 through gateway 903 to the gateway 923 (e.g., to implement step G to retrieve information from datastore 921). This means that any requests from the UI materials 925 executing at the central management node 907 will be acted upon by the local node 917 as if it is locally being executed. As noted above, any suitable gateway may be used to perform these actions, e.g., where the gateway comprises a web server and servlet container implemented using Apache Tomcat.

Figure 14:
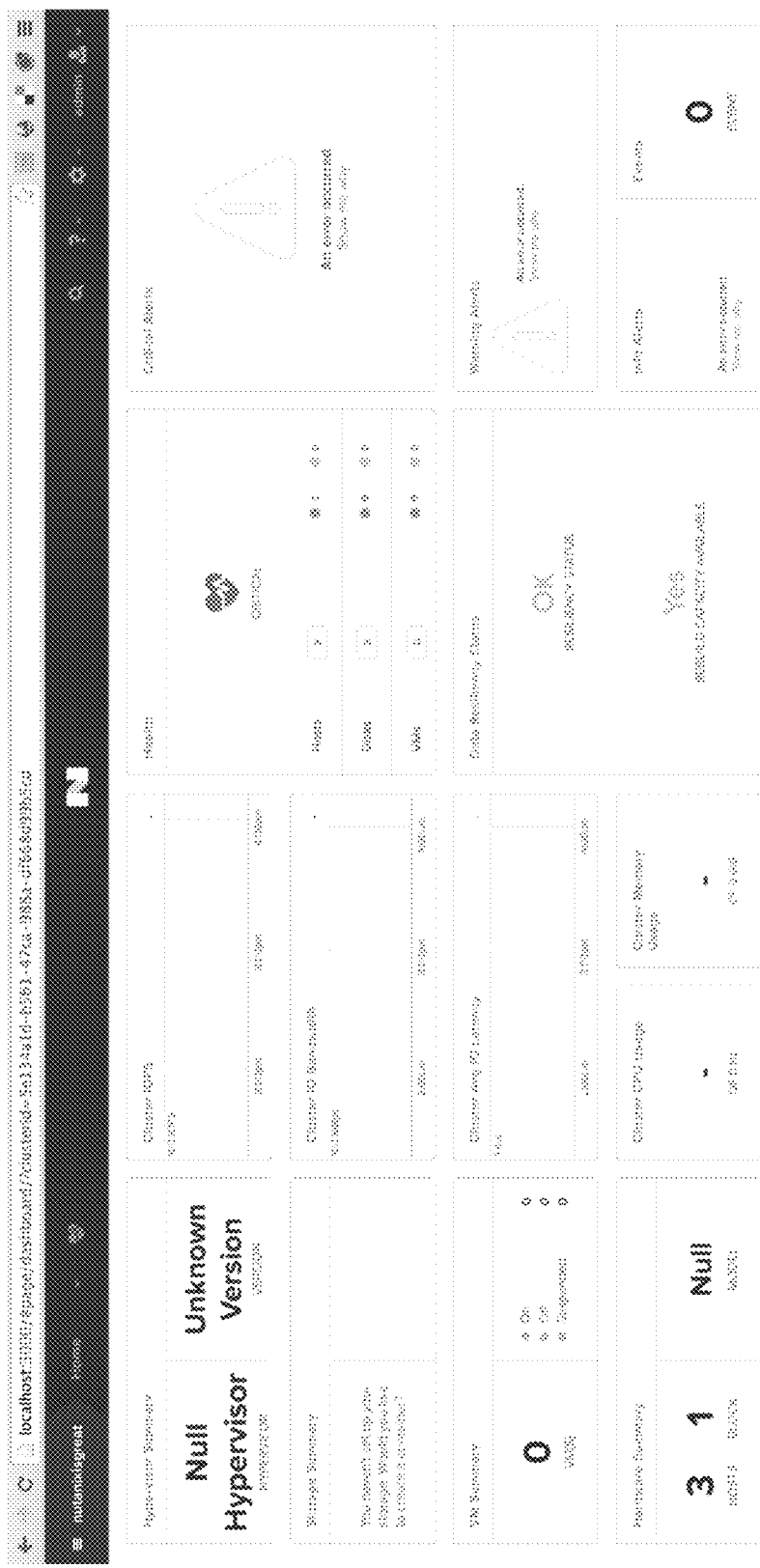

Also at step F, results are sent through gateway 923 to the gateway 903 and then used to populate the user interface displayed at the user station 902 at step H. This produces, for example, a display of the local interface for node 917 at the user station (e.g., as shown in FIG. 14).

Figure 10:
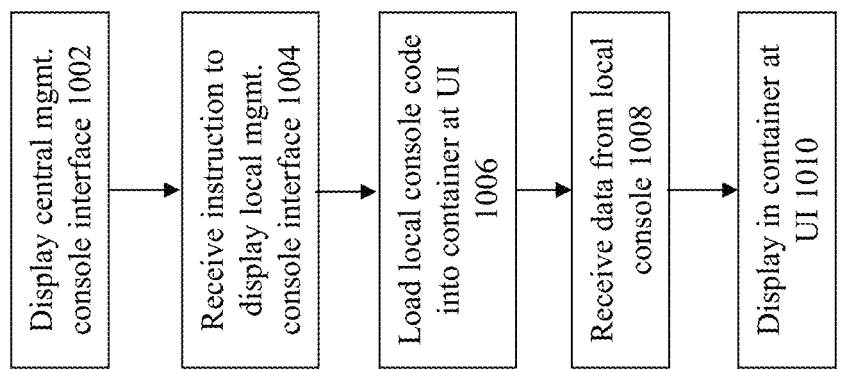
FIG. 10 shows a flowchart for loading UI materials according to some embodiments of the invention.

FIG. 10 shows a flowchart of the processing flow for the inventive approach. At 1002, the user interface for the central management console is displayed to the user. The interface may include a list of the local systems for which management is being provided using the central management console. Any of the local systems identified in the list is capable of being selected by the user.

At 1004, the user provides a selection of one of the local systems on the list on the user interface. This may occur, for example, when the user double-clicks upon one of the items in the displayed list. This causes an instruction to be made to display the local management console in the user interface.

At 1006, the code for the local management interface from the local node is loaded into a container at the user interface that is presented by the central management node. In some embodiments, the container is an iframe which is used to render the UI materials for the local management console.

There are different ways in which the central management console acquires the UI materials from the local node. In some embodiments, during a registration stage, identification is made of all of the different versions of the UI materials code that exist in the computing environment along with a mapping of those versions to specific nodes. The UI materials versions may then be obtained ahead of time and locally stored at the central node instantly available in the event of a user selection. In an alternate embodiment, this may occur dynamically when the user makes a selection from the list, where the UI materials code is dynamically retrieved from the local node for execution/rendering. In yet another embodiment, caching may occur so that the dynamically retrieved UI materials code is cached at the central node, and so that it does not need to be repetitively retrieved.

At 1008, the data from the local node is retrieved and used to populate the user interface. When the UI materials is placed inside the iframe at the central node's interface, this means that the UI materials is now being executed at the central node rather than the local node. In some embodiments, this means that the UI materials is executing in the browser of the client machine, and the browser is connecting directly to the gateway of the central management console, which then handles the requests or routes the requests to the appropriate local management node. As a result, the data requests are passed to the local node for the data retrieval. In some embodiments, this occurs by having the gateways proxy the request and the subsequent response, which are routed through the gateways and then are passed-through to the UI materials in the iframe. At 1010, the data can then be displayed in the container in the user interface.

Figure 11:
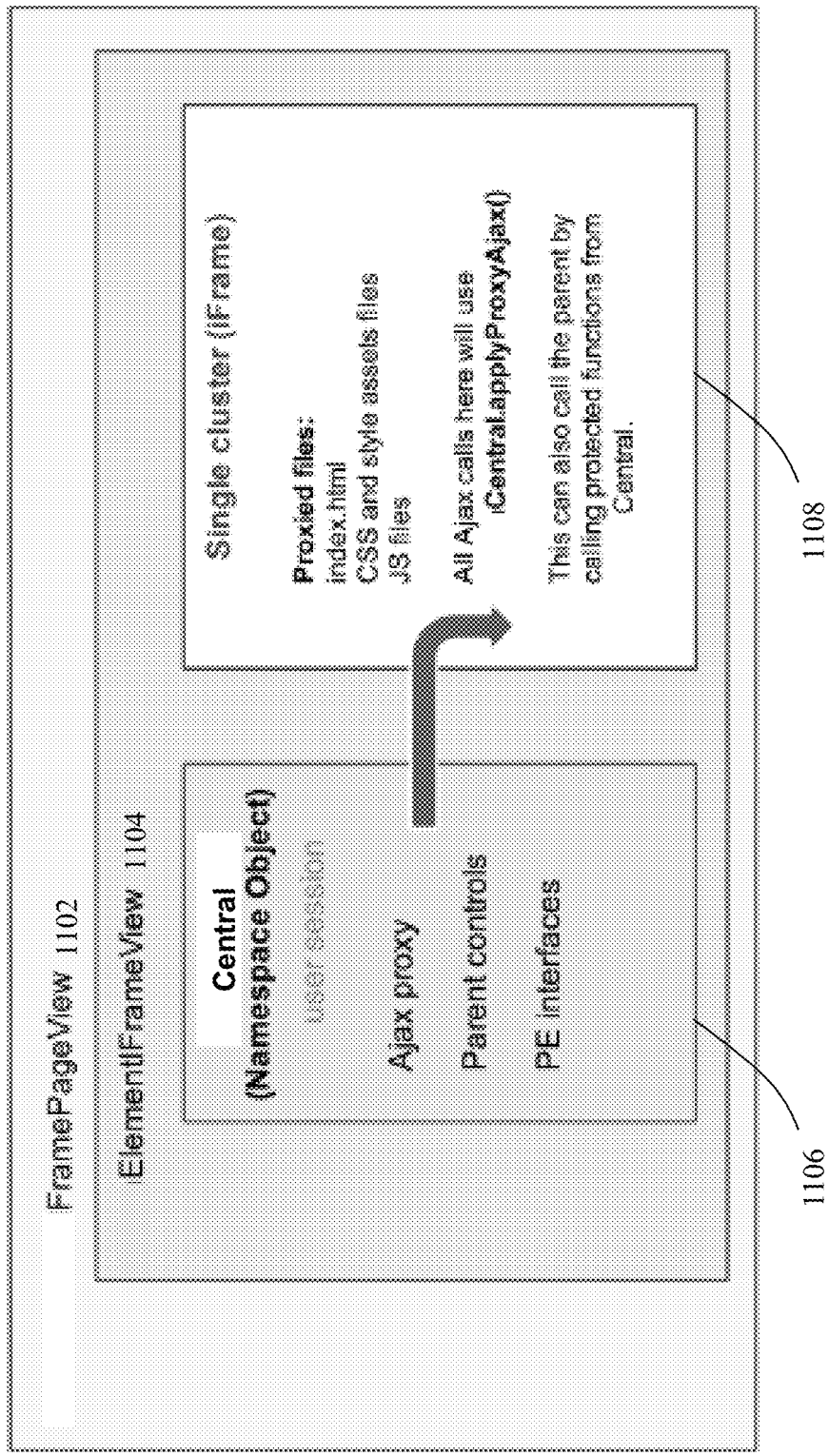
FIG. 11 provides a more detailed illustration for implementing some embodiments of the invention.

FIG. 11 provides a more detailed illustration for implementing some embodiments of the invention. In some embodiments, a single page UI is displayed within the browser, where the UI contents are all loaded using a JavaScript application. This figure shows the architecture of the frame page view 1102 and element frame view 1104 for an individual JavaScript object. Here, a central namespace object 1106 is injected to the single cluster iframe 1108, where the JavaScript object is passed as an object into an iframe of the central console's interface.

The index.HTML file is the first-obtained file, and this file provides a reference of the content (additional files) that is needed for the UI rendering. The CSS and style assets file are used to provide additional content for the UI to be rendered on the page.

As shown in this figure, the requests and responses are formatted as Ajax proxy requests that are sent through the gateways for processing by a local node. All Ajax calls therefore are routed through the gateways. The Ajax proxy will intercept all Ajax requests, and attach the appropriate cluster-ID to the request which is sent through the central node's gateway to the appropriate local cluster gateway. This approach is particularly advantageous, since this avoids any inefficiencies associated with having to separately address firewalls, user sessions, etc.

In addition, parent controls are provided in this architecture, which permits interfacing between the object within the iframe and functionality in the parent interface for the central management console interface. This provides functionality from the parent interface into the iframe, e.g., to display the list of nodes for selection in the interface.

The reason for these parent controls is because, by default, most browsers for security reasons will not typically an iframe to talk to its parent. However, in the current application of the technology, communications is enabled from the iframe to the parent, e.g., to allow manipulation of certain/selected navigation controls at the parent. For example, a "back" button at the parent may need to be manipulated to permit the user to navigate back from a particular UI page. This is facilitated by injecting the namespace object, so that the sandbox object of the iframe can talk to the parent.

It is noted that this approach also facilitates authentication efficiencies, since authentication information can also be shared and used within the iframe. This permits the Ajax call to re-use the same authentication information from the parent. This approach is useful, for example, to implement single-sign-on functionality for the UI.

FIGS. 12, 13, and 14 illustrate example management interfaces according to some embodiments of the invention. The management console interfaces may provide any desired management function. In some embodiments, the console allows the user to monitor and manage multiple clusters through a single web console. The central console displays numerous possible types of dashboard views, such as: (a) Home—Displays a main dashboard that provides a dynamic summary view across the registered clusters; (b) Health—Displays a health dashboard having dynamically updated health information about hosts, disks, and VMs across the registered clusters; (c) VM—Displays a virtual machine information dashboard having dynamically updated information about virtual machines across the registered cluster; (d) Storage—Displays a storage information dashboard having dynamically updated information about the storage configuration across the registered clusters; (e) Hardware—Displays a hardware information dashboard having dynamically updated information about the hosts and disks across the registered clusters; (f) Analysis—Displays a screen to create and run performance monitors that can dynamically monitor a variety of performance measures across the registered clusters; and/or (g) Alerts—Displays a screen of alert and event messages across the registered clusters.

FIG. 12 shows an example interface 1200 that may be used to present a high-level view of the entire computing environment from a central node, where summary information is provided for multiple underlying systems. This may be an example of the general/base landing page for the management console.

FIG. 13 illustrates an example interface 1300, where the left-hand portion 1302 of the interface provides a selectable list of systems/clusters. Any of the items on this list may be selected to provide the user with further information about a specific system/cluster.

FIG. 14 illustrates an example local interface 1400. This is the UI materials that is generated and rendered using the approach of FIG. 11. The content specific to the local node/cluster would be obtained using proxied requests sent to the local node.

Illustrative Operating Environment

Figure 15:
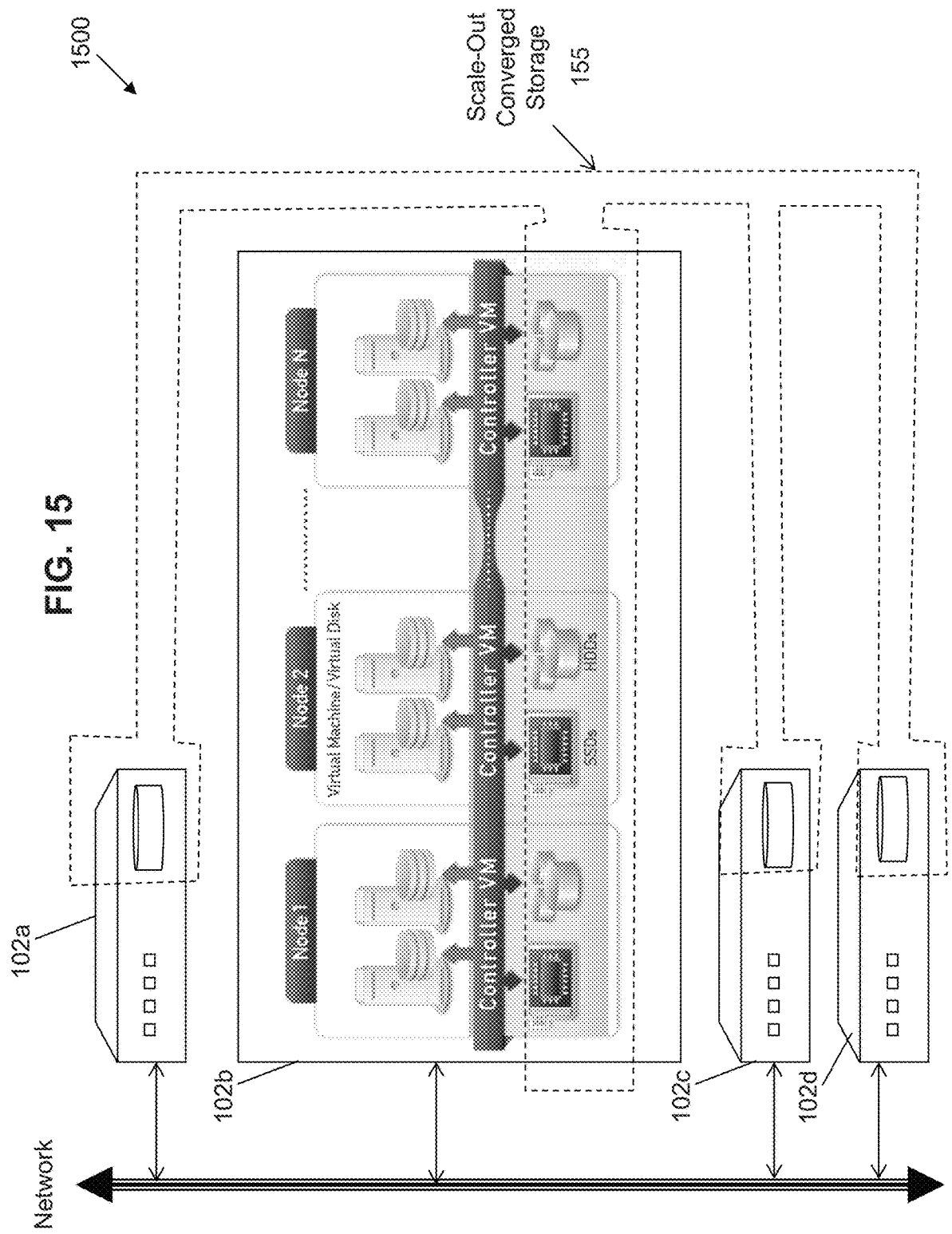
FIG. 15 shows an example storage architecture that can be used in a virtualization system.

The invention can be applied to any type of system. For example, the invention is applicable to manage any virtualization or storage architecture. FIG. 15 shows one example storage architecture that can be used in a virtualization system having an integrated collection (or "cluster") 1500 of virtualization appliances or "blocks" 102a, 102b, 102c, and 102d. Each of the blocks includes hardware and software to implement a virtualization solution. For example, block 102b is internally organized to include hardware and software to implement multiple virtualization nodes. Each node runs a standard hypervisor on hardware that contains processors, memory and local storage, such as a mix of SSDs and/or hard disk drives. Each node runs virtual machines just like a standard virtual machine host.

In addition, local storage from all nodes is virtualized into a unified storage pool, which is referred to herein as "scale-out converged storage" or "SOCS" 155. As described in more detail below, SOCS 155 acts like an advanced SAN that uses local SSDs and disks from all nodes to store virtual machine data. Virtual machines running on the cluster write data to SOCS as if they were writing to a SAN. SOCS is VM-aware and provides advanced data management features. This approach brings the data closer to virtual machines by storing the data locally on the system (if desired), resulting in higher performance at a lower cost. As discussed in more detail below, this solution can horizontally scale from a few nodes to a large number of nodes, enabling organizations to scale their infrastructure as their needs grow.

While traditional SAN solutions typically have 1, 2, 4 or 8 controllers, an n-node system according to the present embodiment has n controllers. Every node in the cluster runs a special virtual machine, called a Controller VM (or "service VM"), which acts as a virtual controller for SOCS. All Controller VMs in the cluster communicate with each other to form a single distributed system. Unlike traditional SAN/NAS solutions that are limited to a small number of fixed controllers, this architecture continues to scale as more nodes are added. In embodiments of the invention, the management console interacts with the controller VMs to configure the SLA policies for storage components.

Figure 16:
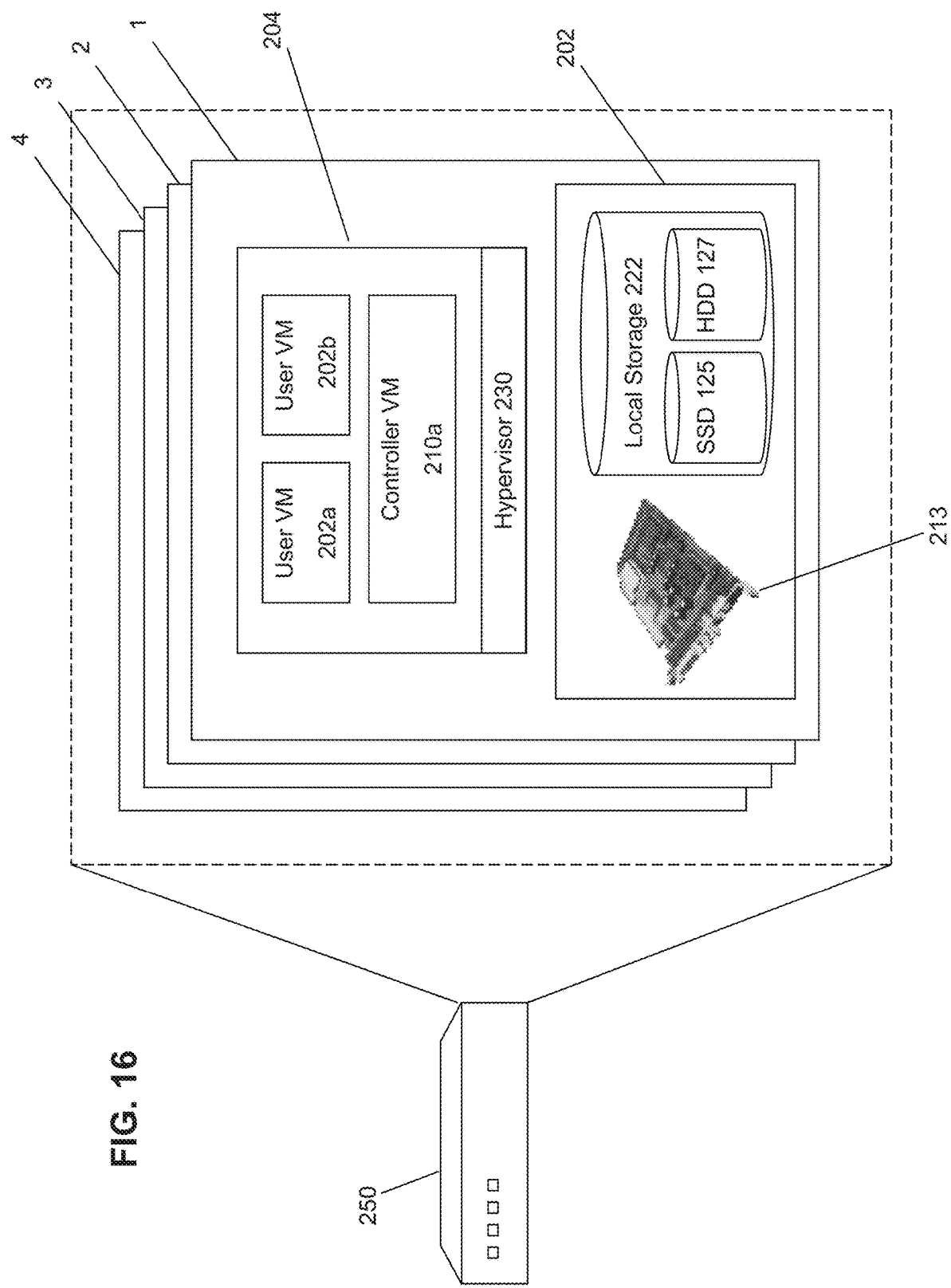
FIG. 16 illustrates a self-contained virtualization appliance.

As stated above, each block includes a sufficient collection of hardware and software to provide a self-contained virtualization appliance, e.g., as shown in FIG. 16. The example block 250 in FIG. 16 includes four nodes 1-4. Having the multiple nodes within a block allows both high performance and reliability. Performance is increased since there are multiple independent nodes to handle the virtualization needs of the system. Reliability is improved since the multiple nodes provide for redundancy in the event of a possible hardware or software error. Moreover, as discussed below, the software-based storage management solution allow for easy movement of data as the storage needs of the system changes.

Each node in the block includes both hardware components 202 and software components 204 to implement virtualization. Hardware components 202 includes processing capacity (e.g., using one or more processors) and memory capacity (e.g., random access memory or RAM) on a motherboard 213. The node also comprises local storage 222, which in some embodiments include Solid State Drives (henceforth "SSDs") 125 and/or Hard Disk Drives (henceforth "HDDs" or "spindle drives") 127. Any combination of SSDs and HDDs may be used to implement the local storage 222.

The software 204 includes a hypervisor 230 to manage the interactions between the underlying hardware 202 and the one or more user VMs 202a and 202b that run client software. A controller VM 210a exists on each node to implement distributed storage management of the local storage 222, such that the collected local storage for all nodes can be managed as a combined SOCS.

Figure 17:
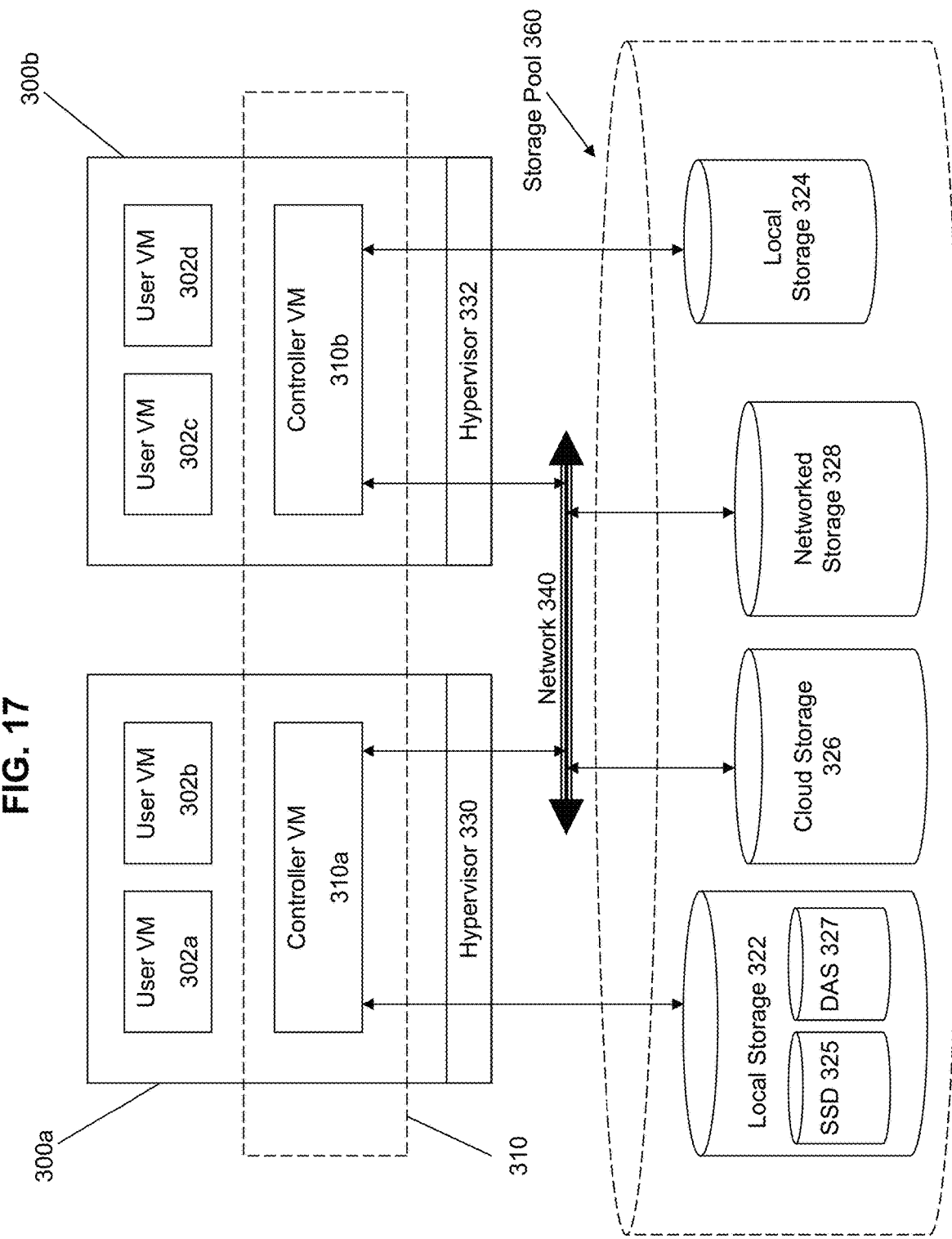
FIG. 17 illustrates an approach for implementing storage management in a virtualization environment according to some embodiments of the invention.

FIG. 17 illustrates an approach for implementing SOCS-based storage management in a virtualization environment according to some embodiments of the invention. The architecture of FIG. 17 can be implemented for a distributed platform that contains multiple nodes/servers 300a and 300b that manages multiple-tiers of storage. The nodes 300a and 300b may be within the same block, or on different blocks in a clustered environment of multiple blocks. The multiple tiers of storage include storage that is accessible through a network 340, such as cloud storage 326 or networked storage 328 (e.g., a SAN or "storage area network"). In addition, the present embodiment also permits local storage 322/324 that is within or directly attached to the server and/or appliance to be managed as part of the storage pool 360. As noted above, examples of such storage include any combination of SSDs 325 and/or HDDs 327. These collected storage devices, both local and networked, form a storage pool 360.

Virtual disks (or "vDisks") can be structured from the storage devices in the storage pool 360, as described in more detail below. As used herein, the term vDisk refers to the storage abstraction that is exposed by a Controller VM to be used by a user VM. In some embodiments, the vDisk is exposed via iSCSI ("internet small computer system interface") or NFS ("network file system") and is mounted as a virtual disk on the user VM. Each server 300a or 300b runs virtualization software, such as VMware ESXi™, Microsoft Hyper V™, or Red Hat® KVM. The virtualization software includes a hypervisor 330/332 to manage the interactions between the underlying hardware and the one or more user VMs 302a, 302b, 302c, and 302d that run client software.

Controller VM 310a/310b (also referred to herein as "service VMs") are used to manage storage and I/O activities. This is the distributed "Storage Controller" in the currently described architecture. Multiple such storage controllers coordinate within a cluster to form a single-system. The Controller VMs 310a/310b are not formed as part of specific implementations of hypervisors 330/332. Instead, the Controller VMs run as virtual machines above hypervisors 330/332 on the various nodes/servers 302a and 302b, and work together to form a distributed system 310 that manages all the storage resources, including the locally attached storage 322/324, the networked storage 328, and the cloud storage 326. Since the Controller VMs run above the hypervisors 330/332, this means that the current approach can be used and implemented within any virtual machine architecture, since the Controller VMs of embodiments of the invention can be used in conjunction with any hypervisor from any virtualization vendor.

Each Controller VM 310a-b exports one or more block devices or NFS server targets that appear as disks to the client VMs 302a-d. These disks are virtual, since they are implemented by the software running inside the Controller VMs 310a-b. Thus, to the user VMs 302a-d, the Controller VMs 310a-b appear to be exporting a clustered storage appliance that contains some disks. All user data (including the operating system) in the client VMs 302a-d resides on these virtual disks.

Significant performance advantages can be gained by allowing the virtualization system to access and utilize local (e.g., server-internal) storage 322 as disclosed herein. This is because I/O performance is typically much faster when performing access to local storage 322 as compared to performing access to networked storage 328 across a network 340. This faster performance for locally attached storage 322 can be increased even further by using certain types of optimized local storage devices, such as SSDs 325. Once the virtualization system is capable of managing and accessing locally attached storage, as is the case with the present embodiment, various optimizations can then be implemented to improve system performance even further. For example, the data to be stored in the various storage devices can be analyzed and categorized to determine which specific device should optimally be used to store the items of data. Data that needs to be accessed much faster or more frequently can be identified for storage in the locally attached storage 322. On the other hand, data that does not require fast access or which is accessed infrequently can be stored in the networked storage devices 328 or in cloud storage 326. In addition, the performance of the local storage can be further improved by changing the mix of SSDs and HDDs within the local storage, e.g., by increasing or decreasing the proportion of SSDs to HDDs in the local storage.

System Architecture

Figure 18:
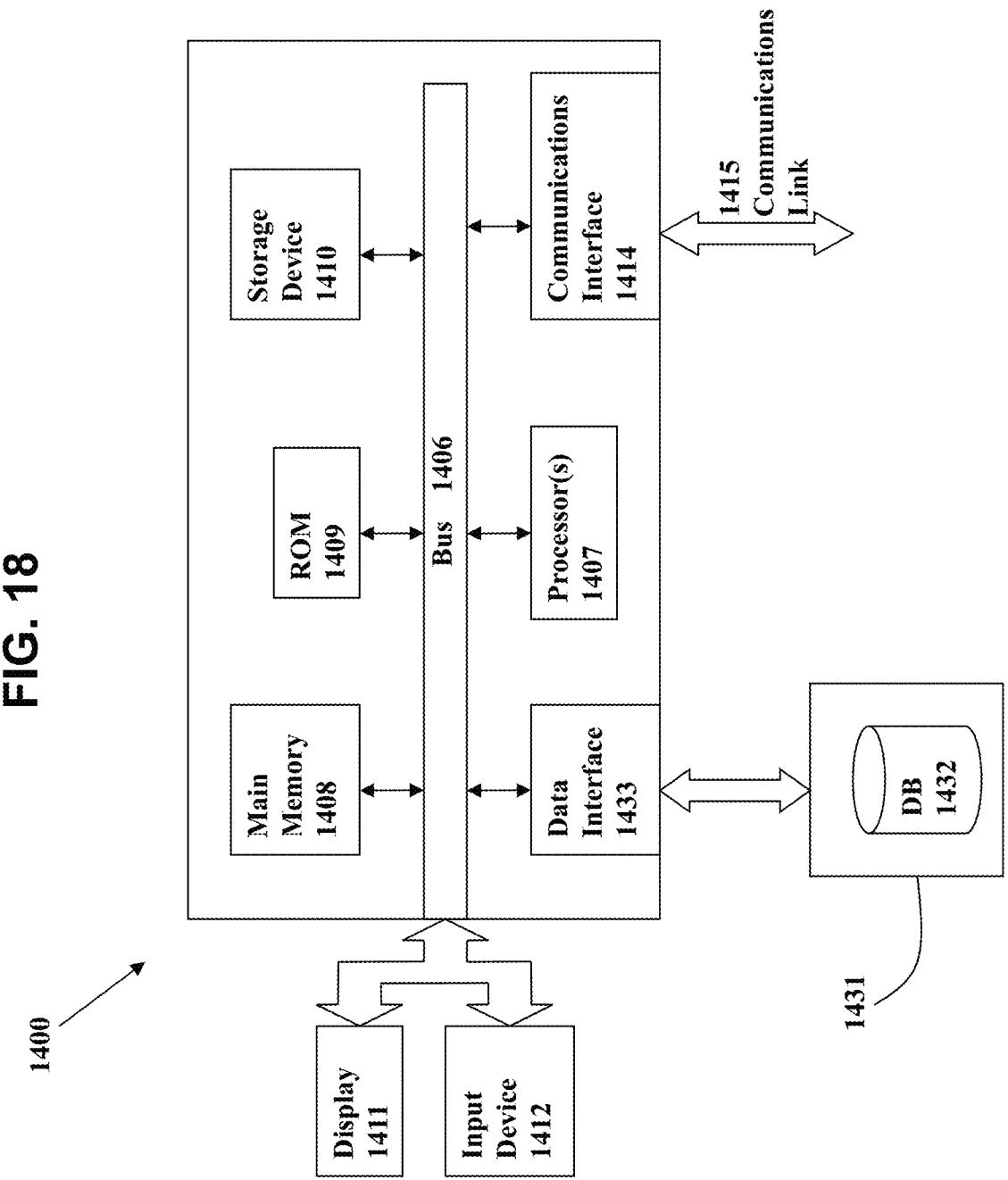
FIG. 18 is a block diagram of a computing system suitable for implementing an embodiment of the present invention.

FIG. 18 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Computer system 1400 may include a database 1432 inside a storage medium 1431, the storage medium 1431 communicatively coupled to data interface 1433.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method comprising:
identifying a central management node;
registering local nodes at the central management node, wherein registration of the local nodes comprises identifying a user interface (UI) version of a management console UI for each of the local nodes;
caching, at the central management node, a first version of local node UI materials corresponding to a first UI version of the management console UI for a first local node and a second version of the local node UI materials corresponding to a second UI version of the management console UI for a second local node;
receiving a request for managing the first local node; and
executing a cached copy of the first version of the local node UI materials in a user interface at the central management node, wherein requests made using the first version of the local node UI materials are processed locally at the first local node.

2. The method of claim 1, wherein registration is performed to cache different versions of the local node UI materials at the central management node.

3. The method of claim 2, wherein registration causes at least one of (a) immediate copying of the local node UI materials to the central management node; (b) lazy copying where the local node UI materials are copied to the central management node over time; or (c) copying of the local node UI materials to the central management node at a time when a user makes a request to access the local node UI materials.

4. The method of claim 1, wherein the local node UI materials cached at the central management node comprise JavaScript files, CSS files, and image files.

5. The method of claim 1, wherein the local node UI materials comprise both static UI content and node-specific content, where the static UI content is common across multiple nodes on a same UI version, and where node-specific content comprises metadata for a local node.

6. The method of claim 1, wherein each of the central management node and a local node comprises a management virtual machine.

7. The method of claim 1, wherein a local node comprises a cluster of nodes.

8. A computer program product embodied on a non-transitory computer readable medium, the non-transitory computer readable medium having stored thereon a sequence of instructions which, when executed by a processor causes the processor to execute a method, the method comprising:
identifying a central management node;
registering local nodes at the central management node, wherein registration of the local nodes comprises identifying a user interface (UI) version of a management console UI for each of the local nodes;
caching, at the central management node, a first version of local node UI materials corresponding to a first UI version of the management console UI for a first local node and a second version of the local node UI materials corresponding to a second UI version of the management console UI for a second local node;
receiving a request for managing the first local node; and
executing a cached copy of the first version of the local node UI materials in a user interface at the central management node, wherein requests made using the first version of the local node UI materials are processed locally at the first local node.

9. The computer program product of claim 8, wherein registration is performed to cache different versions of the local node UI materials at the central management node.

10. The computer program product of claim 9, wherein registration causes at least one of (a) immediate copying of the local node UI materials to the central management node; (b) lazy copying where the local node UI materials are copied to the central management node over time; or (c) copying of the local node UI materials to the central management node at a time when a user makes a request to access the local node UI materials.

11. The computer program product of claim 8, wherein the local node UI materials cached at the central management node comprise JavaScript files, CSS files, and image files.

12. The computer program product of claim 8, wherein the local node UI materials comprise both static UI content and node-specific content, where the static UI content is common across multiple nodes on a same UI version, and where node-specific content comprises metadata for a local node.

13. The computer program product of claim 8, wherein each of the central management node and a local node comprises a management virtual machine.

14. The computer program product of claim 8, wherein a local node comprises a cluster of nodes.

15. A system comprising:
a processor;
a memory for holding programmable code; and
wherein the programmable code includes instructions for identifying a central management node, registering local nodes at the central management node, wherein registration of the local nodes comprises identifying a user interface (UI) version of a management console UI for each of the local nodes, caching, at the central management node, a first version of local node UI materials corresponding to a first UI version of the management console UI for a first local node and a second version of the local node UI materials corresponding to a second UI version of the management console UI for a second local node; and executing a cached copy of the first version of the local node UI materials in a user interface at the central management node, wherein requests made using the first version of the local node UI materials are processed locally at the first local node.

16. The system of claim 15, wherein registration is performed to cache different versions of the local node UI materials at the central management node.

17. The system of claim 16, wherein registration causes at least one of (a) immediate copying of the local node UI materials to the central management node; (b) lazy copying where the local node UI materials are copied to the central management node over time; or (c) copying of the local node UI materials to the central management node at a time when a user makes a request to access the local node UI materials.

18. The system of claim 15, wherein the local node UI materials cached at the central management node comprise JavaScript files, CSS files, and image files.

19. The system of claim 15, wherein the local node UI materials comprise both static UI content and node-specific content, where the static UI content is common across multiple nodes on a same UI version, and where node-specific content comprises metadata for a local node.

20. The system of claim 15, wherein each of the central management node and a local node comprises a management virtual machine.

21. The system of claim 15, wherein a local node comprises a cluster of nodes.

* * * * *